United States Patent
Manolakos et al.

(10) Patent No.: US 11,212,053 B2
(45) Date of Patent: Dec. 28, 2021

(54) METHODS AND APPARATUS RELATED TO DEMODULATION REFERENCE SIGNAL DESIGN AND RELATED SIGNALING

(71) Applicant: QUALCOMM Incorporated, San Diego, CA (US)

(72) Inventors: Alexandros Manolakos, San Diego, CA (US); Jae Won Yoo, San Diego, CA (US); Hari Sankar, San Diego, CA (US); Yi Huang, San Diego, CA (US); Wanshi Chen, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 16/044,385

(22) Filed: Jul. 24, 2018

(65) Prior Publication Data
US 2019/0052420 A1    Feb. 14, 2019

Related U.S. Application Data

(60) Provisional application No. 62/544,705, filed on Aug. 11, 2017.

(51) Int. Cl.
*H04L 5/00* (2006.01)
*H04L 5/14* (2006.01)

(52) U.S. Cl.
CPC ............ *H04L 5/005* (2013.01); *H04L 5/0012* (2013.01); *H04L 5/0051* (2013.01); *H04L 5/1469* (2013.01)

(58) Field of Classification Search
None
See application file for complete search history.

(56) References Cited

U.S. PATENT DOCUMENTS

2015/0163790 A1   6/2015   Lee et al.
2017/0215188 A1   7/2017   Kim et al.
(Continued)

FOREIGN PATENT DOCUMENTS

TW   201728104 A   8/2017

OTHER PUBLICATIONS

Ericsson: "On DL DMRS Design", 3GPP Draft; R1-1711043 on DL DMRS Design, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017, XP051300243, Retrieved from the Internet: URL:http://www.3gpp.org/ftp/Meetings_3GPP_SYNC/RAN1/Docs/ [retrieved on Jun. 26, 2017], 5 pages.
(Continued)

*Primary Examiner* — Mohammad S Adhami
(74) *Attorney, Agent, or Firm* — Arent Fox, LLP

(57) ABSTRACT

In an aspect of the disclosure, a method, a computer-readable medium, and an apparatus are provided. The apparatus maybe a base station or a UE. In an aspect, the apparatus may determine locations for a number of DM-RS symbols to be transmitted in a scheduling unit of a channel configured in a slot/mini-slot, where a last DM-RS symbol maybe positioned one symbol prior to a last symbol carrying scheduled data. In another aspect, the apparatus may determine the locations for the DM-RS symbols based on a selection between a first set of predetermined DM-RS positions and a second set of predetermined DM-RS positions. In another aspect, the apparatus may determine the locations for the DM-RS symbols based on a set number of symbols, wherein the determined locations are spaced apart according to the set number of symbols. The apparatus may transmit the DM-RS symbols based on the determined locations.

34 Claims, 20 Drawing Sheets

(56) References Cited

U.S. PATENT DOCUMENTS

| | | |
|---|---|---|
| 2019/0052422 A1* | 2/2019 | Yin ................. H04L 1/1867 |
| 2019/0140801 A1* | 5/2019 | Ko .................. H04L 27/2613 |
| 2019/0140806 A1* | 5/2019 | Andersson ........... H04L 5/0051 |
| 2019/0288816 A1 | 9/2019 | Ren et al. |
| 2019/0349023 A1* | 11/2019 | Ge .................... H04L 5/00 |
| 2020/0052944 A1 | 2/2020 | Zhang et al. |
| 2020/0235894 A1 | 7/2020 | Takeda et al. |

OTHER PUBLICATIONS

Interdigital et al., "On DM-RS design for NR", 3GPP Draft; R1-1710933 DM-RS design for NR, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017, XP051300134, Retrieved from the Internet: URL:http://www.3gpp.org/ftp/Meetings_3GPP_SYNC/RAN1/Docs/ [retrieved on Jun. 26, 2017], 3 pages.

International Search Report and Written Opinion—PCT/US2018/043732—ISA/EPO—dated Oct. 4, 2018.

Qualcomm Incorporated: "Discussion on DL DMRS Design", 3GPP Draft; R1-1711170, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017, XP051300370, Retrieved from the Internet: URL:http://www.3gpp.org/ftp/Meetings_3GPP_SYNC/RAN1/Docs/ [retrieved on Jun. 26, 2017], 12 pages.

Taiwan Search Report—TW107125666—TIPO—dated Oct. 4, 2021.

* cited by examiner

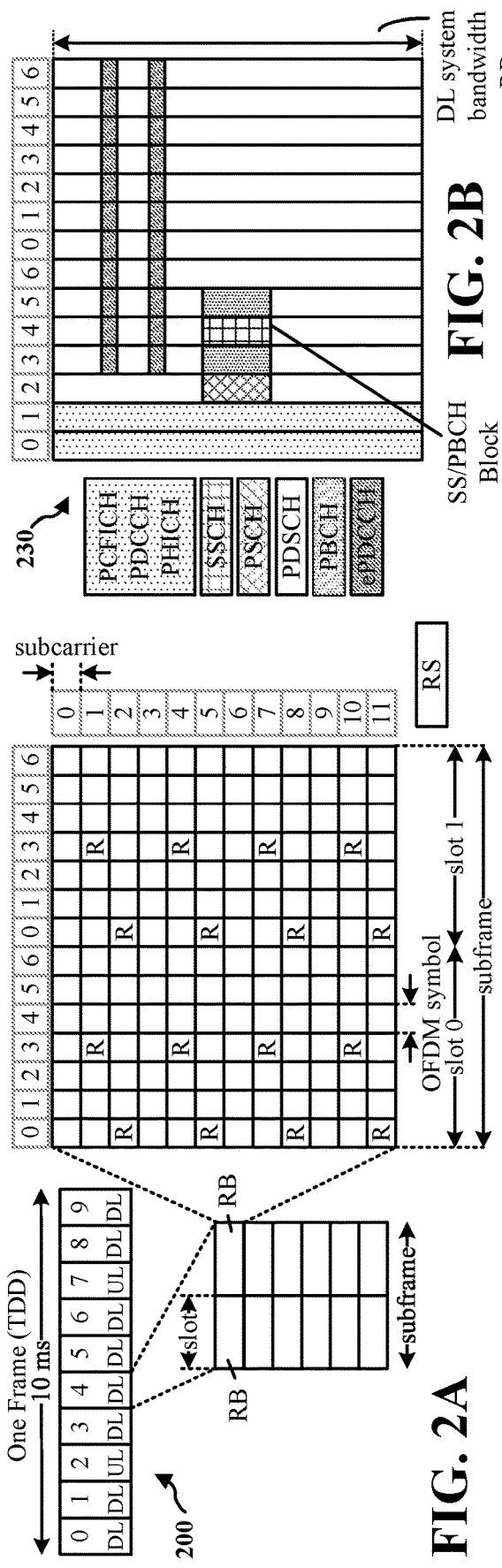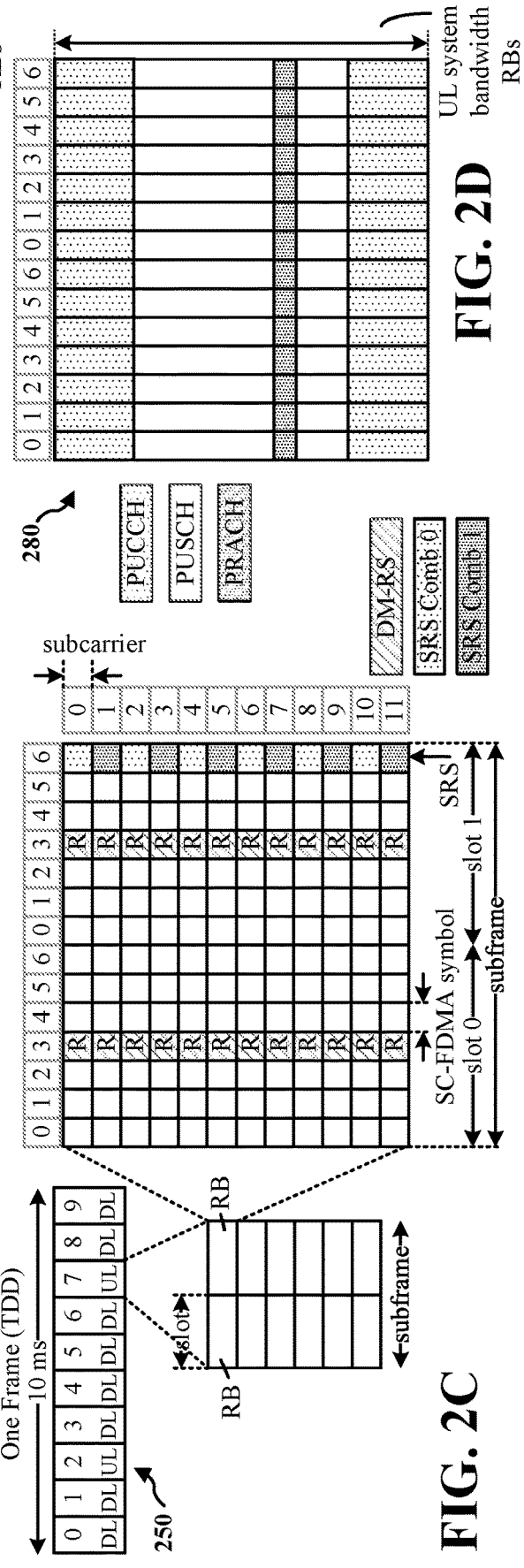

METHODS AND APPARATUS RELATED TO DEMODULATION REFERENCE SIGNAL DESIGN AND RELATED SIGNALING

CROSS-REFERENCE TO RELATED APPLICATION(S)

This application claims the benefit of U.S. Provisional Application Ser. No. 62/544,705 entitled "METHODS AND APPARATUS RELATED TO DEMODULATION REFERENCE SIGNAL DESIGN AND RELATED SIGNALING" filed on Aug. 11, 2017, which is expressly incorporated by reference herein in its entirety.

BACKGROUND

Technical Field

The present disclosure relates generally to communication systems, and more particularly, to methods and apparatus related to demodulation reference signal (DM-RS) design for use in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a base station or a user equipment (UE). In one configuration, the apparatus may be configured to determine locations for a number of demodulation reference signal (DM-RS) symbols to be transmitted within a scheduling unit of a channel included in a slot or a mini-slot, wherein a last DM-RS symbol may be positioned in the scheduling unit one symbol prior to a last symbol carrying scheduled data. The apparatus may be further configured to transmit the number of DM-RS symbols in the scheduling unit based on the determined locations.

In another aspect of the disclosure, a method, a computer-readable medium, and an apparatus are provided. The apparatus may be a base station or a UE. In one configuration, the apparatus may be configured to determine locations for a number of DM-RS symbols to be transmitted within a scheduling unit of a channel included in a slot or a mini-slot based on a selection between a first set of predetermined DM-RS positions and a second set of predetermined DM-RS positions. The apparatus may be further configured to transmit the number of DM-RS symbols in the scheduling unit based on the determined locations.

In another aspect of the disclosure, a method, a computer-readable medium, and an apparatus are provided. The apparatus may be a base station or a UE. In one configuration, the apparatus may be configured to determine locations for a number of DM-RS symbols to be transmitted within a scheduling unit of a channel included in a slot or a mini-slot based on a set number of symbols, wherein the determined locations corresponding to the DM-RS symbols may be spaced according to the set number of symbols. The apparatus may be further configured to transmit the determined number of DM-RS symbols in the scheduling unit based on the determined locations.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL frame structure, DL channels within the DL frame structure, an UL frame structure, and UL channels within the UL frame structure, respectively.

DETAILED DESCRIPTION

Figure 1:
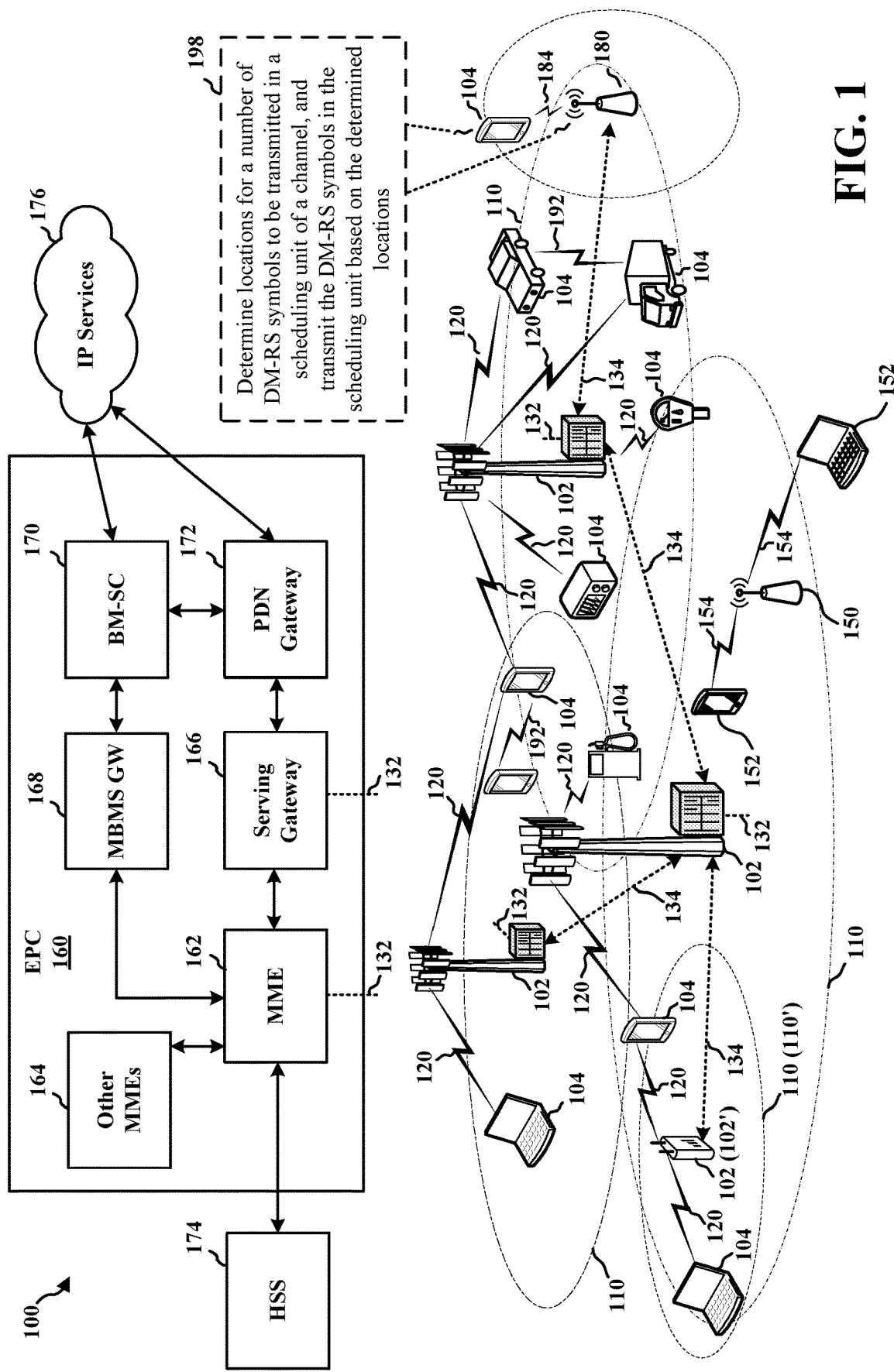
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and/or the base station 180 may be configured to determine locations for a number of DM-RS symbols to be transmitted within a scheduling unit of a channel configured in a slot or a mini-slot, where a last DM-RS symbol maybe positioned one symbol prior to a last symbol carrying scheduled data (198). The UE 104 and/or the base station 180 may transmit the determined number of DM-RS symbols in the scheduling unit based on the determined locations (198). In one configuration, the number and/or locations for DM-RS symbols within the scheduling unit may be determined based on one or more of a duration of the scheduling unit, a number of control symbols in the slot or mini-slot, a number of guard symbols in the in the slot or mini-slot, a number of uplink/downlink symbols in an uplink/downlink burst within the slot or mini-slot, and a number of symbols carrying scheduled data. In one configuration, a last DM-RS symbol is positioned one symbol prior to a last symbol carrying scheduled data. Various aspects related to determining/selecting the locations of DM-RS symbols for transmission in a scheduling unit, e.g., a slot/min-slot, are discussed in detail with respect to FIGS. 4-18.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
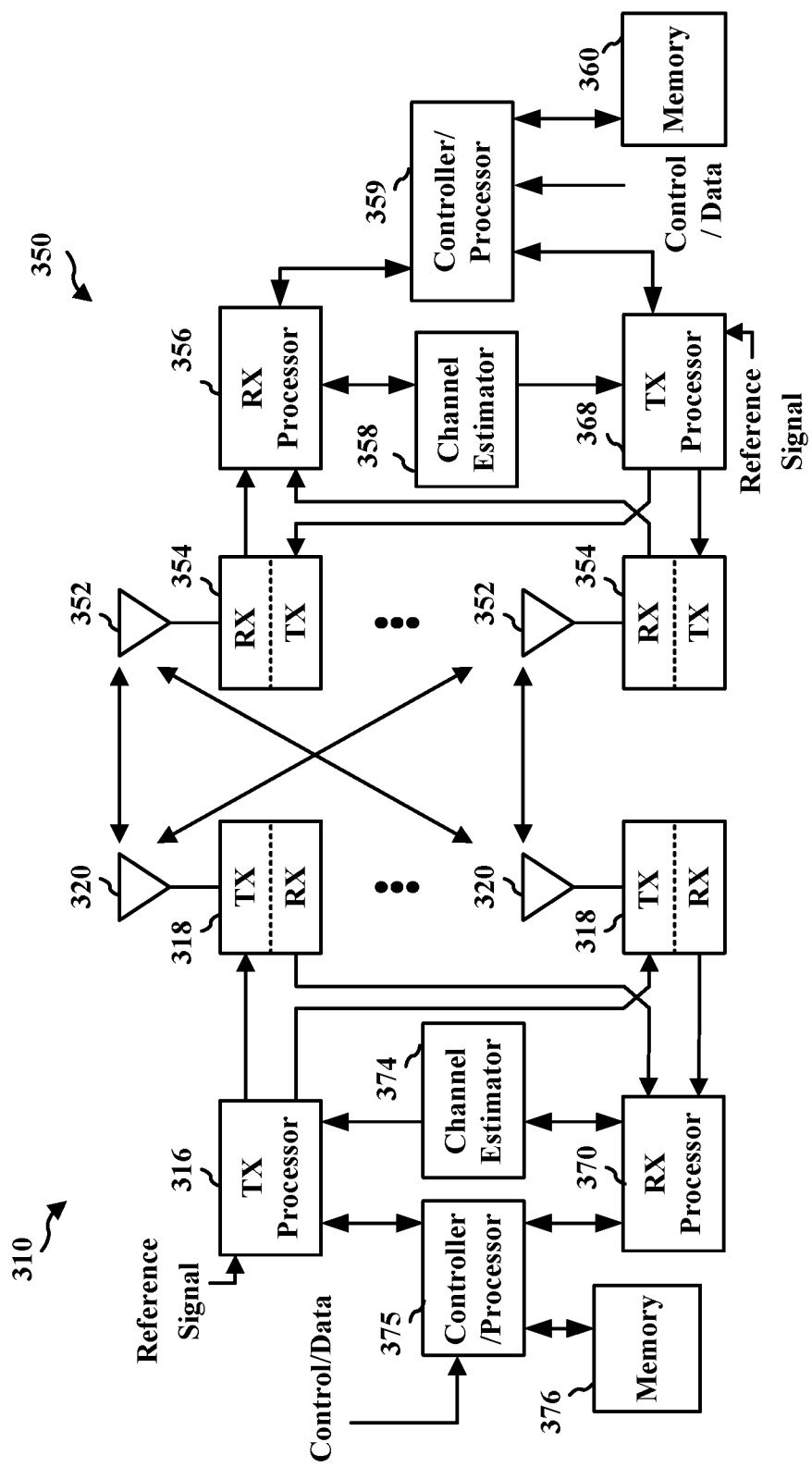
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Demodulation reference signal (DM-RS) symbols in some wireless communications (e.g., 5G NR systems) may be configurable, e.g., the number and/or location/position of DM-RS symbols in a scheduling unit may be configurable. A slot or a mini-slot (associated with an uplink/downlink channel) may comprise a scheduling unit including front load DM-RS symbol(s) which may be defined, for example, as DM-RS symbol(s) that may be positioned relatively early in the slot, e.g., close to the start of the scheduling unit, following any control symbols in the slot or mini-slot. A slot may be 7 or 14 symbols (e.g., OFDM symbols). A scheduling unit of a channel may correspond to time duration in which traffic/data for the channel is scheduled. For example, a scheduling unit of a channel may have a duration from, e.g., 2 to 14 symbols. For example, for a channel comprising 10 symbols for scheduled data, the scheduling unit may comprise or be equal to the duration of the 10 symbols. The scheduling unit may comprise the entire slot/mini-slot (e.g., entire duration of the slot/mini-slot) or may occupy a portion of the slot/mini-slot. In accordance with one aspect, there may be one or more front load DM-RS symbols, e.g., occupying one OFDM symbol or 2 adjacent OFDM symbols within the scheduling unit. Additional DM-RS symbol(s) (e.g., other than the front load DM-RS symbol(s)) may also be included in the scheduling unit. The additional DM-RS symbol(s) may be positioned later in the scheduling unit relative to the front-load DM-RS symbol(s) and have the same density per port.

For downlink, a UE may be informed about the first DM-RS symbol position in a slot/scheduling unit of a PDSCH. In some cases, for slot-based scheduling, the first DM-RS symbol position may be fixed on the 3rd or 4th symbol of the slot. For non-slot-based scheduling, the first DM-RS symbol may be positioned at the 1st symbol of the scheduled data. However, the position/location of additional DM-RS symbols is not defined in earlier systems. For uplink, the first DM-RS symbol position of the PUSCH is fixed relative to the start of the scheduled data. There may be an additional possibility of another fixed position of the first DM-RS symbol relative to the start of slot. The exact fixed position may be changed depending on the duration of the scheduled data (e.g., duration of the scheduling unit) in the channel. Again for the uplink case, the position/location of additional DM-RS symbols is not defined in earlier systems.

Various features and configurations described herein relate to configuring DM-RS symbols in downlink and/or uplink channels, e.g., such as PDSCH and PUSCH, that may be used in wireless communication systems, e.g., 5G NR systems. In an aspect, the number and/or location(s) of the DM-RS symbols within a scheduling unit of a channel may not be fixed (as in some LTE designs) but may rather be configurable. For example, the number and/or location(s) of the DM-RS symbols in a scheduling unit of a channel may be configured, e.g., based on a size/duration of the scheduling unit of the channel, to improve overall system performance. Thus, some features related to the DM-RS design described herein provide advantages and improvements over existing solutions, for example, in high speed/mobility and high density (e.g., high number of nodes) environments where it may be advantageous to select the number and location of DM-RS based on the given conditions. For example, the use of the front load DM-RS symbol and additional DM-RS symbols at locations (e.g., in a scheduling unit associated with a downlink/uplink channel such as PDSCH/PUSCH) selected based on the proposed methods may be advantageous for better tracking/estimation of the channel at high speeds and/or high density environments. Similarly, having the flexibility to configure number and/or location(s) of the DM-RS symbols depending on a given deployment scenario and/or communication environment may provide several similar advantages.

In one aspect, DM-RS symbol locations for a non-scheduled slot are proposed. In some configurations, a common mechanism to determine the location(s) for both slot and mini-slot based scheduling may be used. In some implementations, a slot may comprise at least 14 symbols, whereas a mini-slot may comprise 13 or fewer symbols (e.g., 4, 7, 10 symbols etc.). In an aspect, any of a preamble DM-RS, a midamble DM-RS, and a postamble DM-RS may be configured for a channel. The preamble DM-RS may include the front load DM-RS symbol(s). For example, in one configuration the preamble DM-RS may include a first symbol of the front load DM-RS, and may be referred to herein as a front load DM-RS.

Based on deployment and configuration, there may be at least one front load DM-RS symbol and an additional number of DM-RS symbols at various selected locations within the scheduling unit of a channel (e.g., within a slot or mini-slot). In accordance with the proposed methods, the number and location of the additional DM-RS symbols may not be fixed unlike some existing systems, and rather may be chosen based on, e.g., a duration of the scheduling unit, a number of control symbols in the slot or mini-slot, a number of guard symbols or uplink/downlink symbols of a uplink/downlink burst in the slot or mini-slot, number of symbols carrying scheduled data, etc. The duration of the scheduling unit may be expressed in terms of a number of symbols in the scheduling unit.

In one configuration, a preamble and a postamble DM-RS may be used in a scheduling unit of a channel associated with a slot/mini-slot. The postamble DM-RS may also be referred to herein as a last or final DM-RS within the scheduling unit. The preamble DM-RS may include a DM-RS symbol at the front load position (e.g., DM-RS symbol positioned early in the scheduling unit). The postamble DM-RS may be positioned one symbol before the last symbol of the scheduling burst/unit, e.g., one symbol before the last symbol of the slot/mini-slot carrying scheduled data. As discussed supra, assuming a given channel is configured within a slot/mini-slot, the portion of the slot/mini-slot that may carry scheduled traffic of the given channel may be referred to as the scheduling unit of the channel. In one configuration, in addition to the preamble and postamble DM-RS, a midamble DM-RS may also be used within a scheduling unit of a channel. The midamble DM-RS may include a DM-RS symbol positioned between the preamble and the postamble DM-RS symbols, e.g., in a middle position between the preamble DM-RS and the postamble DM-RS. In another configuration, 2 midamble DM-RS symbols may be used within the scheduling unit, e.g., with the 2 midamble DM-RS symbols being positioned between the preamble and the postamble DM-RS symbols for transmission. The 2 midamble DM-RS may be positioned with approximately equal spacing in the symbols between the preamble DM-RS and the postamble DM-RS. Various drawings showing various different possible DM-RS configurations for various possible scheduling units in a slot are illustrated in FIGS. 4-7 and discussed below.

Figure 4:
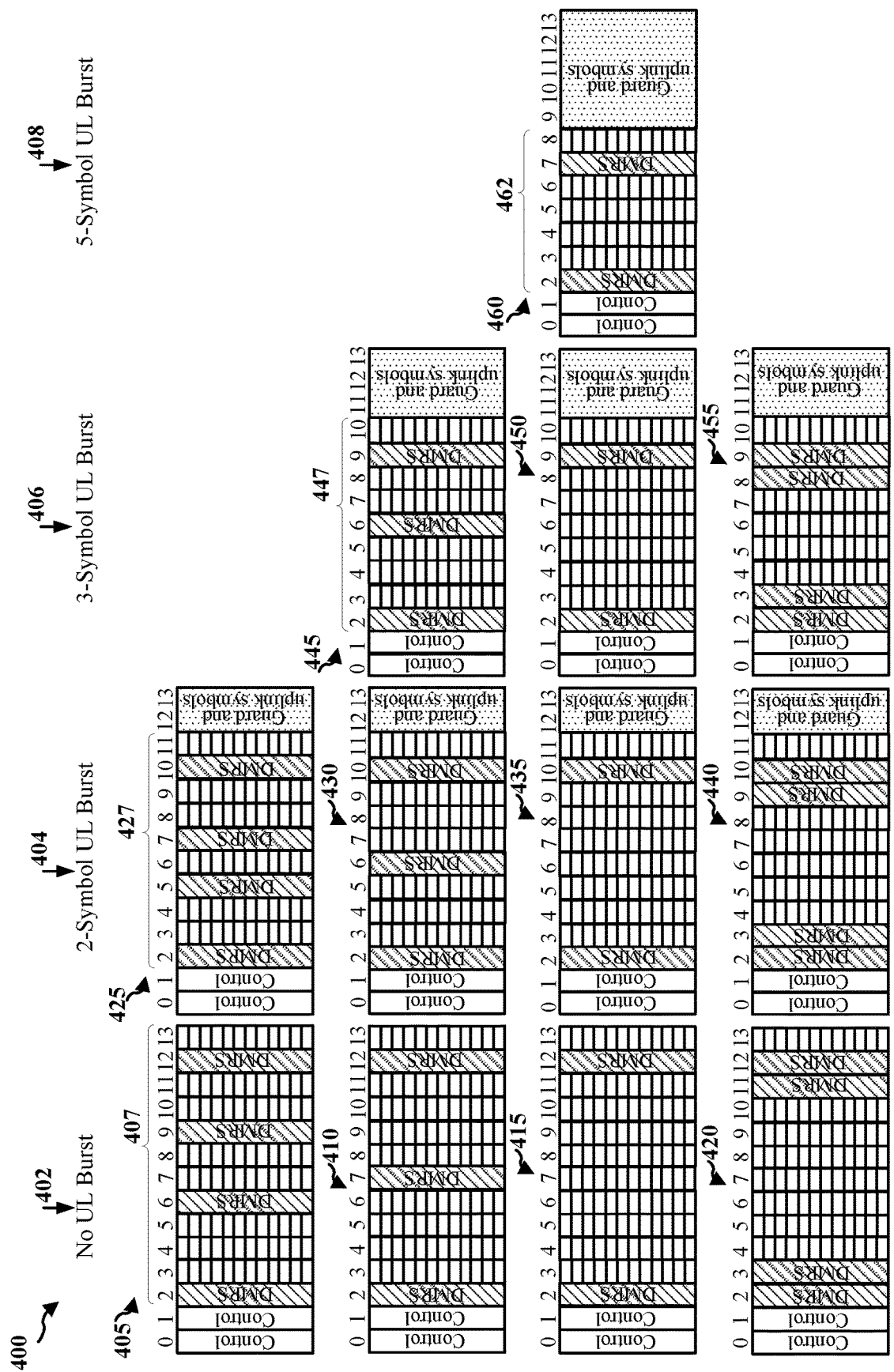
FIG. 4 illustrates several example drawings showing different DM-RS configurations that may be used with a scheduling unit of a downlink channel in a slot with a 2-symbol downlink control block.

FIG. 4 illustrates a diagram 400 including several example drawings showing different DM-RS configurations that may be used in a downlink burst within a slot comprising 14 symbols associated with a downlink channel, e.g., a PDSCH. In FIG. 4, the basic slot in each of the illustrated example drawings includes 2-symbol downlink control block, e.g., 2 control symbols shown in symbol number 0 and 1 in each slot (comprising 14 symbols) shown in the respective example drawings. Each of the 4 example drawings in the first column 402 show a different DM-RS configuration (e.g., with varying number and locations of DM-RS symbols) for a scheduling unit (comprising 12 contiguous symbols 2 to 13) of a downlink channel configured within a slot without uplink burst (e.g., no uplink data/symbols in the slot). For example, the first example drawing 405, that corresponds to column 402, illustrates a slot within which a scheduling unit 407 (comprising 12 contiguous symbols 2 to 13) of a downlink channel is configured with 4 DM-RS symbols that are selectively positioned for transmission within the scheduling unit. The illustrated configuration of drawing 405 includes a preamble DM-RS at the front load DM-RS position (at symbol 2 which is the first symbol of the scheduling unit 407) that is placed early in the slot right after the 2 control symbols (symbols 0 and 1), 2 midamble DM-RS symbols (at symbols 6 and 9) and a postamble DM-RS symbol (at symbol 12 which is the second last symbol of the scheduling unit 407). As discussed above, in accordance with one aspect of the proposed methods, the postamble DM-RS may be positioned one symbol before the last symbol of the slot carrying scheduled data (i.e., one symbol prior to the last symbol of the downlink scheduling unit/burst 407) while the midamble DM-RS symbols may be positioned at approximately equal distance between the preamble and the postamble DM-RS symbols. Accordingly, as shown in the particular example drawing 405 the postamble DM-RS is positioned at symbol 12 which is right before the last symbol (symbol with index 13) carrying scheduled data.

A second example configuration is shown in the drawing 410. Compared to the first example configuration (illustrated in drawing 405), the difference in the second example configuration is that there is only one midamble DM-RS (at symbol 7) positioned at equal distance from the preamble and the postamble DM-RS symbols. A third example configuration is shown in drawing 415. As can be appreciated from the illustration, in the third example configuration shown in drawing 415, only a preamble DM-RS symbol (at front load DM-RS symbol position) and a postamble DM-RS symbol (placed at symbol 12 location) may be transmitted, but no midamble DM-RS has been used in this configuration. The last (fourth) example configuration is shown in drawing 420. In the fourth example configuration, 2 DM-RS symbols are used as preamble DM-RS symbols (e.g., 2 adjacent DM-RS symbols positioned at the front load DM-RS position within the scheduling unit) and another 2 DM-RS symbols are used as postamble DM-RS symbols (at symbols with index 11 and 12).

Each of the example drawings in the second column 404 show a different DM-RS configuration for a downlink scheduling unit (comprising 10 contiguous symbols from symbols 2 to 11) of a downlink channel configured within a slot with a 2 symbol uplink burst (e.g., with the slot including 2 symbols of uplink signaling) as shown in the last 2 symbols (symbol number 12 and 13) of each of the drawings of column 404. The fifth example drawing 425, that corresponds to column 404, illustrates a slot within which a scheduling unit 427 (symbols 2 to 11) of a downlink channel is configured with 4 DM-RS symbols that are selectively positioned in the scheduling unit 427, including, a preamble DM-RS at the front load DM-RS position (at symbol 2) that is early in the scheduling unit right after the 2 control symbols (symbols 0 and 1), 2 midamble DM-RS symbols (at symbols 5 and 7), and a postamble DM-RS symbol (at symbol 10). Again, in accordance with one aspect, the postamble DM-RS symbol is positioned one symbol before the last symbol of the slot carrying scheduled data (e.g., for the given slot comprising the PDSCH, the scheduling unit 427 comprises 10 symbols and the last symbol carrying downlink data is symbol 11). As shown, the midamble DM-RS symbols may be positioned at approximately equal distance between the preamble and the postamble DM-RS symbols.

The sixth configuration shown in drawing 430 corresponding to column is similar to the second configuration (drawing 410), e.g., from the perspective of the number of DM-RS symbols in the respective scheduling units. The sixth configuration also includes a preamble, a midamble and a postamble DM-RS symbol within the scheduling unit, but the two configurations differ in the location of the midamble and postamble DM-RS symbols in the respective scheduling units, as can be observed. The difference in choosing different positions in the second configuration (drawing 410) and the sixth configuration (drawing 430) may be due to the presence of 2 symbol uplink burst (in symbol numbers 12 and 13) in the sixth configuration which changes the size/duration of the scheduling unit. The seventh configuration shown in drawing 435 corresponding to column 404 is similar to the third configuration in drawing 415 (from the perspective of the number of DM-RS symbols in the scheduling unit) with one preamble and one postamble DM-RS symbol included in the scheduling unit. However, the two configurations shown respectively in drawings 415 and 435 differ in the location of the midamble and postamble DM-RS symbols in the respective scheduling unit, e.g. due to the presence of 2 symbol uplink burst (in symbol numbers 12 and 13) in the seventh configuration shown in drawing 435 and no such uplink burst symbols in the third configuration shown in drawing 415 which causes different size scheduling units. Similarly, it may be observed that the eighth configuration shown in drawing 440 is similar to the fourth configuration shown in drawing 420 (in terms of the number of DM-RS symbols in the scheduling unit) with a 2 DM-RS symbol preamble and a 2 DM-RS symbol postamble but with the postamble DM-RS symbols at different symbol locations.

The example drawings (445, 450 and 455) in the third column 406 which show different DM-RS configurations for scheduling units of a downlink channel configured within a slot with a 3 symbol uplink burst (as shown in the last 3 symbols of each of the drawings of column 406) may be understood in the same or similar manner as the example configurations discussed with respect to columns 402 and 404. The ninth example configuration shown in drawing 445 is similar (in terms of a number of DM-RS symbols within the scheduling unit) to the second and sixth configurations (shown in drawings 410 and 430 respectively) with a preamble, midamble and postamble DM-RS symbols included in the scheduling unit 447 but with the location of the midamble DM-RS symbol and postamble DM-RS symbol being different in comparison to the other configurations. Again, this difference in positioning may be based on the size/duration of the scheduling unit 447, which is different the size of scheduling units in drawings 410 and 430, due to the presence of a larger (3 symbol) uplink burst in the slot shown in the ninth configuration (drawing 445). The tenth example configuration shown in drawing 450 is similar to the third and seventh configurations (drawings 415 and 435) from the perspective of the number of DM-RS symbols within the scheduling unit, e.g., with a preamble and a postamble DM-RS symbol being transmitted in the scheduling unit but the location of the postamble DM-RS symbol being different in each configuration. The eleventh example configuration shown in drawing 455 is similar to the fourth and eighth configurations (drawings 420 and 440) with a 2 DM-RS symbol preamble and a 2 DM-RS symbol postamble but with the postamble DM-RS symbols at different symbol locations. As illustrated in drawing 455, in the eleventh example configuration, there are 4 DM-RS symbols that are selectively positioned in the scheduling unit. For example, 2 preamble DM-RS symbols are positioned at the front load DM-RS position (at symbols 2 and 3) after the 2 control symbols (symbols 0 and 1), while 2 postamble DM-RS symbols are positioned at symbols 8 and 9.

The last example configuration is shown in drawing 460 in the fourth column 408 that illustrates a twelfth DM-RS configuration for a scheduling unit 462 of a channel configured in a slot with a 5 symbol uplink burst (as shown in the last 5 symbols of the drawing in column 408). Similar to the third, seventh, and tenth configurations, the twelfth DM-RS configuration shown in drawing 460 includes 2 DM-RS symbols, e.g., a preamble and a postamble DM-RS symbol, but the location of the postamble DM-RS symbol in the twelfth DM-RS configuration is different than the other configurations. In the twelfth configuration, a preamble DM-RS symbol at symbol 2 and a postamble DM-RS symbol at symbol 7. It may be appreciated that while the number and/or DM-RS symbol locations in each of the above discussed configurations may change, the principle/mechanism to select a location for a DM-RS symbol (whether preamble, midamble, or postamble) may remain the same, for example, preamble DM-RS at the front load DM-RS position, postamble DM-RS positioned one symbol before the last symbol of the slot carrying scheduled data, and the midamble DM-RS symbols (if any) positioned at approximately equal distance between the preamble and the postamble DM-RS symbols. Furthermore, as discussed supra, the number and location of the DM-RS symbols within a scheduling unit of a channel may be based on the size/duration of the scheduling unit (e.g., number of symbols for the scheduled data of the channel).

Figure 5:
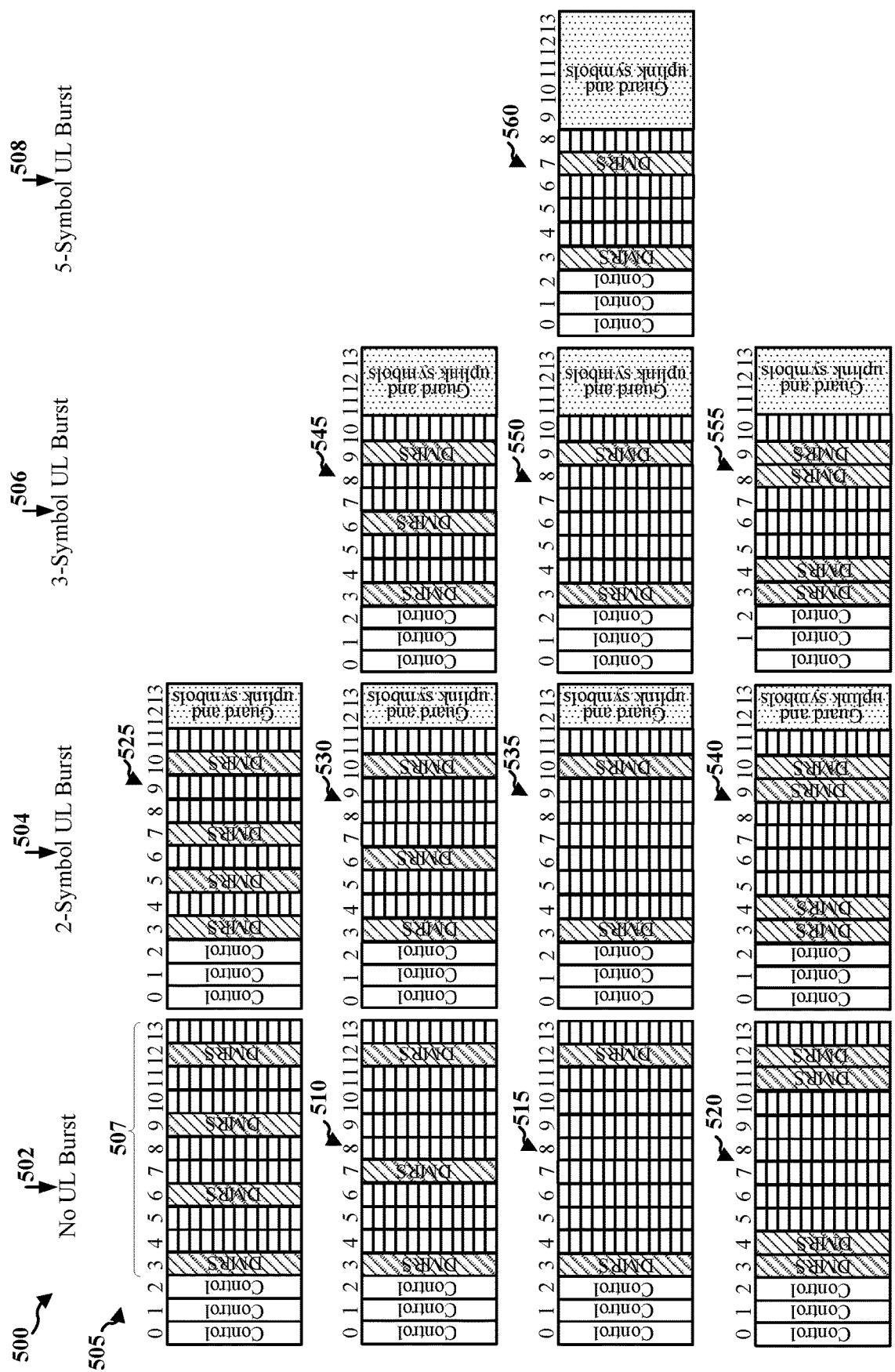
FIG. 5 illustrates several example drawings showing different DM-RS configurations that may be used with a scheduling unit of a downlink channel in a slot with a 3-symbol downlink control block.

FIG. 5 illustrates a diagram 500 including several example drawings showing different DM-RS configurations that may be used in a downlink burst/scheduling unit in a slot with a 3-symbol downlink control block. As illustrated in each of the example drawings, the 3-symbol downlink control block occupies symbol number 0, 1 and 2 in each of the 14 symbol slots shown in the respective example drawings. In FIG. 5, each of the example drawings 505, 510, 515, and 520 shown in the first column 502, show a different DM-RS configuration (e.g., with varying number and location of DM-RS symbols) for a scheduling unit (comprising 11 contiguous symbols from symbols 3 to 13) of a downlink channel configured within a slot without an uplink burst (e.g., no uplink data in the slot). For example, drawing 505 illustrates a first example configuration with 4 DM-RS symbols that are selectively positioned for transmission in a scheduling unit 507 (that corresponds to a duration of the scheduled data in symbols 3 to 13) of the channel in accordance with the features described supra. In the illustrated configuration of drawing 505, a preamble DM-RS is included at the front load DM-RS position (at symbol 3 which is the first symbol of the scheduling unit 507) in the scheduling unit 507, e.g., right after the 3 control symbols (symbols 0, 1, and 2). In addition, there are 2 midamble DM-RS symbols (at symbols 6 and 9) and a postamble DM-RS symbol (at symbol 12). As discussed supra, in accordance with one aspect, the postamble DM-RS may be positioned one symbol before the last symbol carrying scheduled data, while the midamble DM-RS symbols may be positioned at approximately equal distance between the preamble and the postamble DM-RS symbols. Accordingly, as shown in the example configuration of drawing 505, the postamble DM-RS is positioned at symbol 12 which is right before the last symbol carrying scheduled data (symbol 13) and the midamble DM-RS symbols (at symbols 6 and 9) are positioned at approximately equal distance between the preamble DM-RS symbol (at symbol 3) and the postamble DM-RS symbol (at symbol 12).

In a second example configuration shown in drawing 510, a preamble DM-RS is included at the front load DM-RS position within the scheduling unit (at symbol 3 of the slot which is the first symbol of the scheduling unit), a midamble DM-RS symbol is included at symbol 7, and a postamble DM-RS symbol is included at symbol 12. Compared to the first example configuration (illustrated in drawing 505), the difference in the second example configuration is that there is only one midamble DM-RS (at symbol 7) positioned at approximately equal distance from the preamble and the postamble DM-RS symbols. In a third example configuration shown in drawing 515, only a preamble DM-RS symbol (at symbol 3) and a postamble DM-RS symbol (placed at symbol 12 location) may be transmitted, but no midamble DM-RS has been used in this configuration. In the fourth example configuration shown in drawing 520, 2 adjacent DM-RS symbols are used as preamble DM-RS symbols (e.g., positioned at the front load DM-RS position) and another 2 DM-RS symbols are used as postamble DM-RS symbols (at symbols with index 11 and 12) before the last symbol (symbol 13) carrying the scheduled data. As shown, the number and/or location of the DM-RS symbols in each of the configurations may differ and may be selected for use by a base station (e.g., base station 180/310), e.g., based on deployment environment or other factors known the base station. For example, under some conditions, for a slot with no uplink burst, the base station may use the DM-RS configuration illustrated in drawing 505 whereas under some other conditions the base station may use the DM-RS configuration illustrated in drawing 515.

Each of the example drawings (525, 530, 535, and 540) in the second column 504 show a different DM-RS configuration for a scheduling unit (comprising 9 contiguous symbols from symbols 3 to 11) of a downlink channel configured in a slot with a 2 symbol uplink burst as shown in the last 2 symbols (symbol number 12 and 13). The third column 506 includes different DM-RS configuration drawings (545, 550, and 555 for a scheduling unit of a channel in a slot with a 3 symbol uplink burst (shown in the last 3 symbols of each of the drawings of column 506). The last column 508 includes a drawing 560 showing a DM-RS configuration for a scheduling unit of a channel configured in a slot with a 5 symbol uplink burst (shown in the last 5 symbols of the drawing of column 508). The different example DM-RS configurations shown in the drawings of FIG. 5 can be described and understood in a similar manner as discussed with respect to FIG. 4 example. As can be observed and appreciated from the illustrated configurations, while the number and/or DM-RS symbol locations in each of the above discussed configurations may change, the principle/mechanism for selecting a location for a DM-RS symbol may remain the same.

Figure 6:
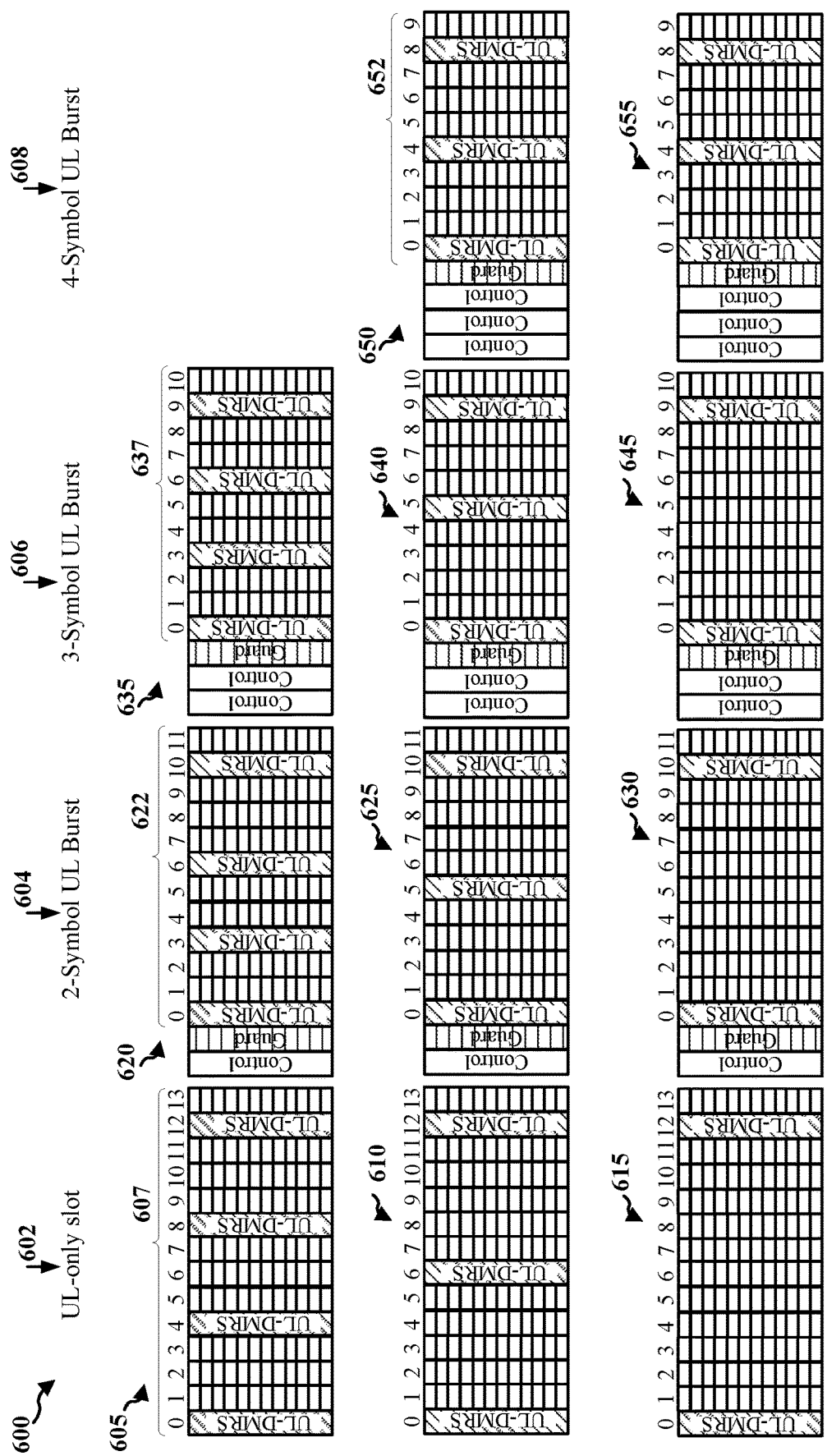
FIG. 6 illustrates several example drawings showing different DM-RS configurations that may be used with a scheduling unit of an uplink channel.

FIG. 6 illustrates a diagram 600 including several example drawings showing different DM-RS configurations that may be used in an uplink burst, e.g., scheduling unit of an uplink channel, e.g., a PUSCH. In each of the illustrated configurations of FIG. 6, it is assumed that the front load DM-RS is in the first symbol of the uplink burst and that there is no uplink control block. The example drawings (605, 610 and 615) in the first column 602 show different DM-RS configurations (e.g., with varying number and location of DM-RS symbols) for a scheduling unit of an uplink channel configured in a slot (e.g., with no downlink burst). In each of the three different example DM-RS configurations for the uplink only slot shown in the three example drawings 605,

610 and 615, the scheduling unit comprises the duration of the entire slot (e.g., duration of scheduled uplink data correspond to the length of 14 symbols) with no downlink burst. For example, the first example configuration illustrated in drawing 605 shows a scheduling unit 607 of an uplink channel including 4 DM-RS symbols (e.g., a preamble, 2 midambles and a postamble) that are positioned in accordance with the methods described herein. The second example configuration illustrated in drawing 610 shows 3 DM-RS symbols (e.g., a preamble, a midamble and a postamble) being transmitted in the scheduling unit. The third example configuration illustrated in drawing 615 shows 2 DM-RS symbols (e.g., a preamble and a postamble) being transmitted in the scheduling unit.

The example drawings (620, 625 and 630) in the second column 604 show different DM-RS configurations for an uplink burst in a slot with a 2 symbol downlink burst (e.g., with the slot having a 2 symbol block of downlink signaling) as shown in the first two (non-indexed) symbols in each of the drawings of column 604. The 2 symbols of the downlink signaling may include one control data symbol and one guard symbol. In the three example DM-RS configurations shown in drawings 620, 625 and 630, the uplink burst (scheduling unit) comprises the twelve symbols marked 0 to 11 of the slot while the first two symbols correspond to the 2 symbol downlink burst. For example, in the example configuration illustrated in drawing 620, a scheduling unit 622 of an uplink channel includes 4 DM-RS symbols including a preamble DM-RS located at the front load DM-RS position (e.g., first symbol position of the scheduling unit 622), 2 midamble DM-RS symbols positioned at symbol 3 and 6 within the scheduling unit 622, and a postamble DM-RS positioned at symbol 10 within the scheduling unit 622.

The example drawings (635, 640, and 645) in the third column 606 show different DM-RS configurations for an uplink burst in a slot with a 3 symbol downlink burst (e.g., with the slot/scheduling unit having a 3 symbol block of downlink signaling) as shown in the first three (non-indexed) symbols in each of the drawings of column 606. The 3 symbols of the downlink signaling block may include 2 symbols of control data and one guard symbol. In the three example DM-RS configurations shown in drawings 635, 640, and 645, the uplink burst (scheduling unit) comprises the eleven symbols marked 0 to 10 of the slot while the first three symbols (unmarked) correspond to the 3 symbol downlink burst. For example, in the configuration illustrated in drawing 635, a scheduling unit 637 of an uplink channel includes 4 DM-RS symbols including a preamble DM-RS located at the front load DM-RS position (e.g., first symbol position of the scheduling unit 637), 2 midamble DM-RS symbols positioned at symbol 3 and 6 within the scheduling unit 637, and a postamble DM-RS positioned at symbol 9 within the scheduling unit 637.

The fourth column 608 includes drawings 650 and 655 showing different DM-RS configurations for an uplink burst in a slot with a 4 symbol downlink burst (e.g., with the slot having a 4 symbol block of downlink signaling). In the 2 different example DM-RS configurations, the uplink burst (scheduling unit) comprises the ten symbols marked 0 to 9 of the slot while the first four symbols (unmarked) correspond to the 4 symbol downlink burst as shown. For example, in the example configuration illustrated in drawing 650, a scheduling unit 652 of an uplink channel includes 3 DM-RS symbols including a preamble DM-RS located at the front load DM-RS position (e.g., first symbol position of the scheduling unit 652), a midamble DM-RS symbol positioned at symbol 4 within the scheduling unit 652, and a postamble DM-RS positioned at symbol 8 within the scheduling unit 652. Again, the principle/mechanism to select a location for a DM-RS symbol (whether preamble, midamble, or postamble) may remain the same as discussed in detail with respect to FIGS. 4-5.

Figure 7:
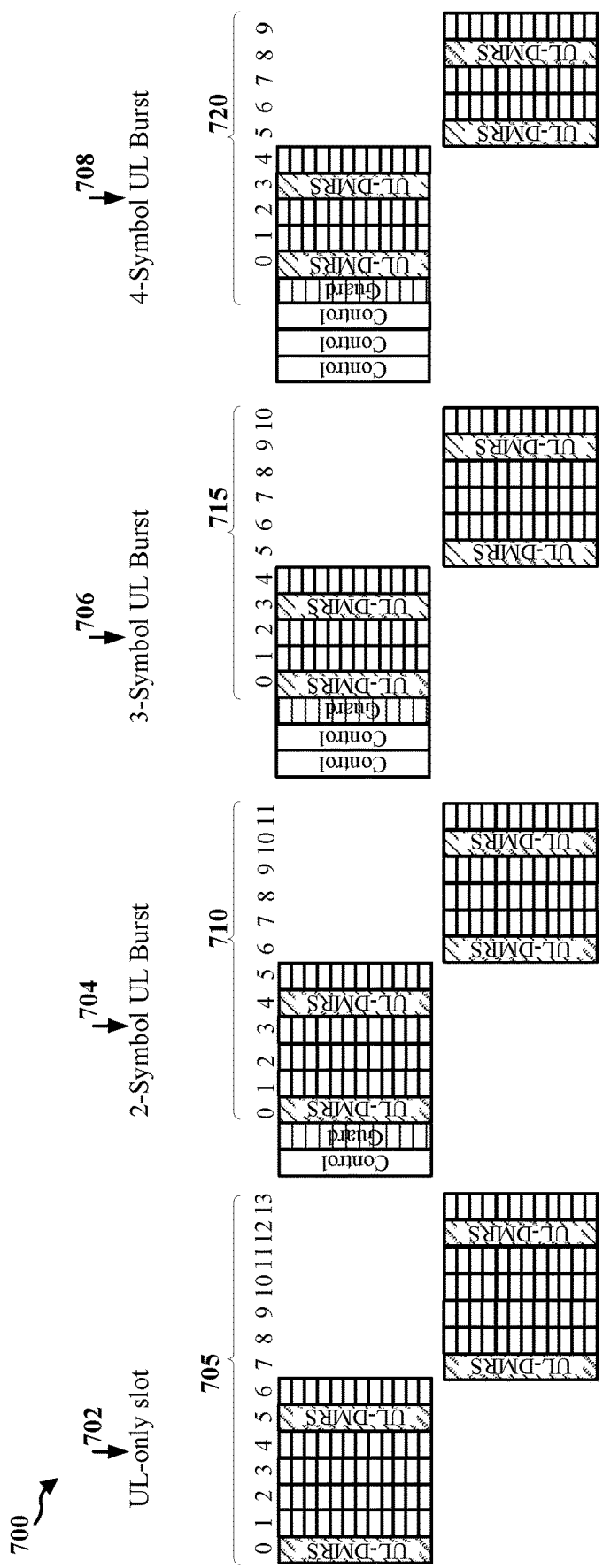
FIG. 7 illustrates example drawings showing different DM-RS configurations that may be used with a scheduling unit of an uplink channel in which frequency hopping within the slot/scheduling unit is employed.

FIG. 7 illustrates a diagram 700 including example drawings showing different DM-RS configurations that may be used with a scheduling unit of an uplink channel (e.g., of a PUSCH) configured in a slot in which frequency hopping (hopping within the scheduling unit) is used. In an aspect, if frequency hopping is used in the scheduling unit, then the counting (for DM-RS symbols) may restart from 0, in the sense that DM-RS symbols may be transmitted again. For example, a DM-RS may be transmitted again in a front load symbol position following the frequency hop and a last DM-RS symbol within the scheduling unit may be positioned one symbol prior to the last symbol before the next frequency hop is performed. Thus, the DM-RS positions may be the same for each frequency hop within a scheduling unit. In the illustrated examples shown in FIG. 7, one hop during the scheduling unit is used. The first column 702 shows a DM-RS configuration for a scheduling unit 710 of an uplink channel (e.g., PUSCH) configured in a slot with no downlink burst. In such a case, the scheduling unit 705 comprises the entire duration of the 14 symbol slot as the slot does not include any other multiplexed signaling burst. The example configuration in column 702 shows 4 DM-RS symbols being transmitted in the scheduling unit 705 but the first two DM-RS symbols correspond to a different sub-band than a sub-band corresponding to the last two DM-RS symbols of the scheduling unit 705, e.g., due to the use of frequency hopping. As can be appreciated, the same pattern has been used for positioning the DM-RS symbols in the two portions of the scheduling unit 705 before and after the hop. For example, in the first portion of the scheduling unit 705 the first DM-RS is positioned at the front load DM-RS position (e.g., at symbol 0 location) and the last DM-RS is positioned one symbol prior to last symbol carrying scheduled data within the first portion of the scheduling unit 705. Then after the hop, the second portion of the scheduling unit 705 starts (from symbol 7 to symbol 13). In accordance with one aspect, counting for the DM-RS symbols restarts from 0 in the second portion of the scheduling unit 705. After the hop, the same DM-RS pattern is followed in the second portion of the scheduling unit 705 as in the first portion of the scheduling unit 705. Thus, in the second portion of the scheduling unit 705, the first DM-RS is positioned at the front load DM-RS position (e.g., at symbol 7 location which is the first symbol in the second portion of the scheduling unit 705) and the last DM-RS is positioned one symbol prior to last symbol carrying scheduled data within the second portion of the scheduling unit 705.

The second column 704 shows a DM-RS configuration for a scheduling unit 710 of an uplink channel configured in a slot with a 2 symbol downlink burst (as shown in the first two non-indexed symbols) where frequency hopping is used within the scheduling unit. In this case, the scheduling unit 710 comprises 12 symbols (symbols 0 to 11) of the slot as the slot includes the 2 symbol downlink burst multiplexed with the uplink burst/scheduling unit 710. Again in the example configuration shown in column 704, 4 DM-RS symbols are transmitted, and the same pattern is used for positioning the DM-RS symbols in the two portions of the scheduling unit 710 before and after the hop.

Similarly, the third column 706 shows a DM-RS configuration for a scheduling unit 715 of an uplink channel configured in a slot with a 3 symbol downlink burst and with frequency hopping used within the scheduling unit 715. In this case, the scheduling unit 715 comprises 11 symbols (symbols 0 to 10) of the slot as the slot includes the 3 symbol downlink burst multiplexed with the uplink burst/scheduling unit 715. Again in this configuration, the same pattern is used for positioning the DM-RS symbols in the two portions of the scheduling unit 710 before and after the hop. For example, in the first portion of the scheduling unit 715 the first DM-RS is positioned at the front load DM-RS position (e.g., at symbol 0 location) and the last DM-RS is positioned one symbol prior to last symbol carrying scheduled data within the first portion of the scheduling unit 715. Then after the hop, DM-RS counting restarts and the first DM-RS of the second portion of the scheduling unit 715 is positioned at the front load DM-RS position (e.g., at symbol 5 location which is the first symbol in the second portion of the scheduling unit 715) and the last DM-RS is positioned (at symbol 9) one symbol prior to last symbol carrying scheduled data within the second portion of the scheduling unit 715.

The fourth column 708 shows a DM-RS configuration for a scheduling unit 720 of an uplink channel configured in a slot with a 4 symbol downlink burst and with frequency hopping used within the scheduling unit 720. As may be appreciated, while intra slot/scheduling unit frequency hopping may be adopted, the same principle/mechanism is used to select DM-RS symbol locations within the each partition of the scheduling unit in the example case of a single hop configuration.

In an aspect, a family of DM-RS locations may be defined. The family may include predefined or predetermined positions for DM-RS symbols within a slot or mini-slot. It may be assumed that only a subset of possible symbols of a scheduling unit may carry the DM-RS symbol. Such a subset of symbols in the scheduling unit that may carry the DM-RS symbols may be referred to as one family of DM-RS. Multiple families of DM-RS positions may be defined or otherwise specified. Then, for a given scheduling unit of an uplink/downlink channel, the DM-RS positions may be determined by selecting one of the families and using the predefined positions associated with the selected family. In one example aspect, which family is selected and/or which subset of symbols carry the DM-RS symbols may depend on one or more of the scheduling unit duration within a slot or mini-slot, uplink/downlink control signaling burst size (e.g., no UL/DL control burst, 2 symbol UL/DL control burst, 3 symbol UL/DL control burst, etc.), and deployment scenario.

In an aspect, at least two different DM-RS families may be defined. For example, a first family may be represented as {2(3),6,9,12} and a second family may be represented as {2(3),5,8,11}. The notation {2(3),6,9,12} includes the symbol indices of the symbols that may carry DM-RS symbols. For example, the notation {2(3),6,9,12} for the first family of DM-RS locations indicates that the DM-RS symbols may be carried by symbols with symbol index 2 and/or 3, 6, 9, and 12. For example, a first/front load DM-RS may occupy symbols with symbol index 2 and/or 3, and the additional DM-RS symbols (if transmitted) may occupy symbols with symbol index 6, 9, and 12. Similarly, the notation {2(3),5,8,11} for the second family of DM-RS location indicates that the DM-RS symbols may be carried by symbols with symbol index 2 or 3, 5, 8, and 11. For example, a first/front load DM-RS may occupy symbols with symbol index 2 and/or 3, and the additional DM-RS symbols (if transmitted) may occupy symbols with symbol index 5, 8, and 11. In an aspect, one family may be supported in a given configuration. Thus, for a given scheduling unit, if the first family {2(3),6,9,12} is selected, then the DM-RS symbols may be located in symbols with symbol index 2 or 3, 6, 9, and 12.

Figure 8:
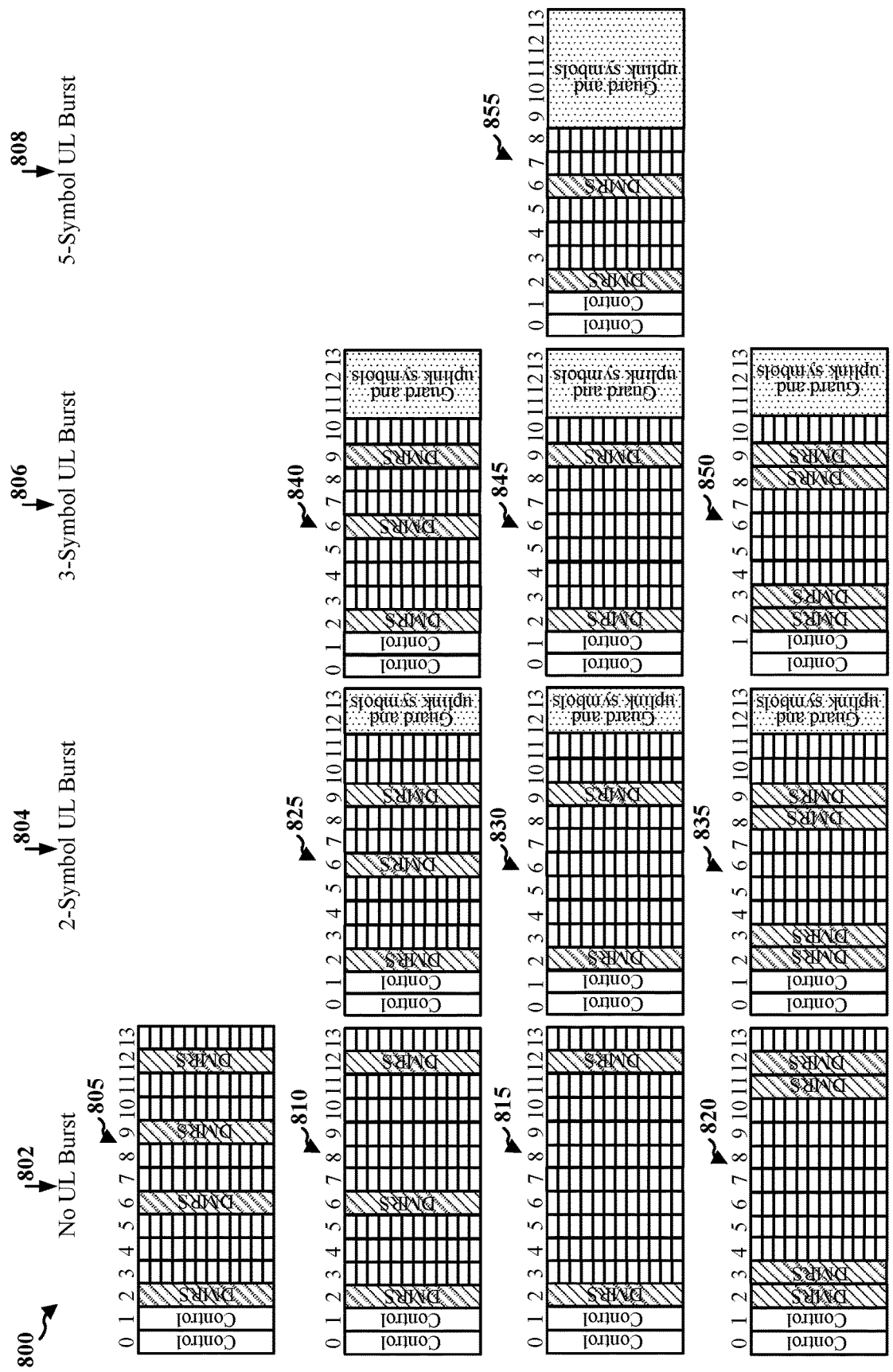
FIG. 8 illustrates several example drawings showing different DM-RS configurations for a scheduling unit of a channel based on a first family of DM-RS symbol locations.

FIG. 8 illustrates a diagram 800 including several example drawings showing different DM-RS configurations for a downlink burst (e.g., scheduling unit of a DL channel) in a slot based on the first family of DM-RS locations represented as {2(3),6,9,12}. Each of the example configurations illustrated in FIG. 8 assume a downlink channel configured in a slot with a 2 symbol downlink control block, e.g., 2 control symbols shown in symbol number 0 and 1 as shown in each of the example drawings. The example drawings in the first column 802 show different DM-RS configurations (based on the first DM-RS family locations {2(3),6,9,12}) for a scheduling unit of a downlink channel (e.g., PDSCH) configured in a slot with no uplink burst (e.g., no guard or uplink symbols in the slot). As shown in drawing 805, the DM-RS symbols are positioned based on the first family of DM-RS locations represented as {2(3),6,9,12}. The first DM-RS symbol is positioned at symbol 2 (e.g., first symbol of the scheduling unit), then two midamble DM-RS symbols positioned at symbols 6 and 9, and the postamble DM-RS at symbol 12. The next drawing 810 of column 802 illustrates a configuration with 3 DM-RS symbols in the scheduling unit positioned at symbols 2, 6 and 12. The next drawing 815 of column 802 illustrates a configuration with 2 DM-RS symbols in the scheduling unit positioned at symbols 2 and 12. The last drawing 820 of column 802 illustrates a configuration with 4 DM-RS symbols in the scheduling unit positioned at symbols 2, 3, 11, and 12.

The second column 804 illustrates drawings 825, 830, and 835 showing different DM-RS configurations (based on the first DM-RS family locations {2(3),6,9,12}) for a downlink burst (e.g., scheduling unit of a downlink channel) in a slot with a 2 symbol uplink burst (shown in symbols 12 and 13). The third column 806 illustrates drawings 840, 845, and 850 showing different DM-RS configurations (based on the first DM-RS family locations {2(3),6,9,12}) for a downlink burst in a slot with a 3 symbol uplink burst (shown in symbols 11, 12 and 13). The fourth column 808 illustrates a drawing 855 showing a DM-RS configuration (based on the first DM-RS family locations {2(3),6,9,12}) for a downlink burst in a slot with a 5 symbol uplink burst (shown in symbols 9-13). As can be observed, in each illustrated example configuration the location of the DM-RS symbols is based on the first family of DM-RS symbol locations {2(3),6,9,12}). Also, as illustrated in some of the illustrated configurations, at times, not all of the DM-RS positions of the family may be used but rather a subset of the predetermined DM-RS positions associated with the selected family may be used.

Figure 9:
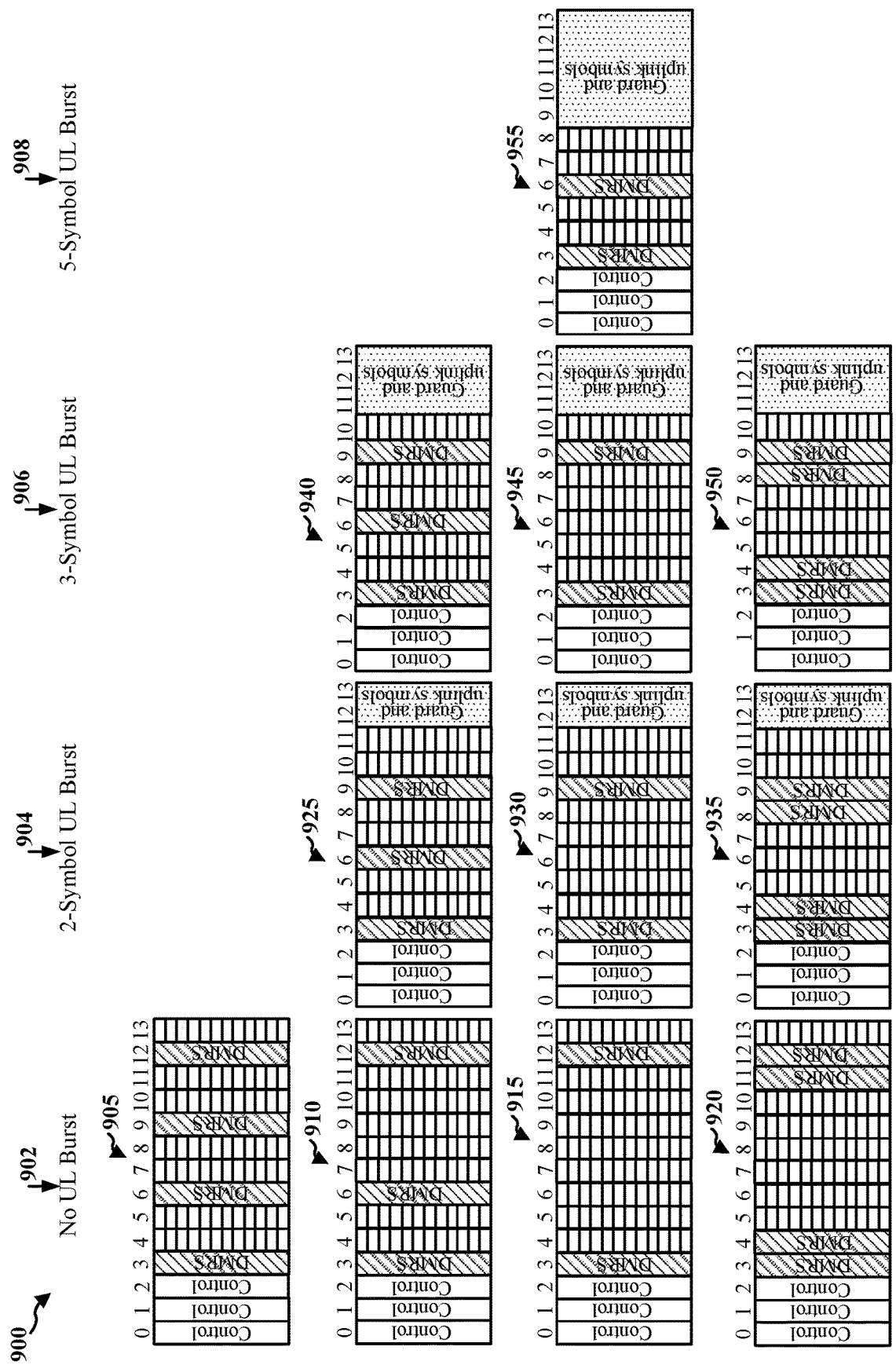
FIG. 9 illustrates different example DM-RS configurations, based on the first family of DM-RS symbol locations, for a scheduling unit of a channel configured in a slot with a 3 symbol downlink control block.

FIG. 9 illustrates a diagram 900 showing different example DM-RS configurations, based on the first family of DM-RS locations {2(3),6,9,12}, for a downlink burst (e.g., scheduling unit of a DL channel) in a slot with a 3 symbol downlink control block. Similar to the examples discussed above in connection with FIG. 8, various different possible DM-RS configurations (illustrated in the different corresponding drawings) based on the first DM-RS family locations {2(3),6,9,12} are illustrated in the drawings shown in columns 902, 904, 906, and 908. The example configurations illustrated in drawings 905, 910, 915 and 920 of the first column 902 show different DM-RS configurations (based on the first DM-RS family locations {2(3),6,9,12}) for a scheduling unit of a downlink channel (e.g., PDSCH) configured in a slot with no uplink burst.

As shown in drawing 905, the DM-RS symbols are positioned based on the first family of DM-RS locations {3,6,9,12}. The first DM-RS symbol is positioned at symbol 3 (e.g., first symbol of the scheduling unit), then two midamble DM-RS symbols positioned at symbols 6 and 9, and the postamble DM-RS at symbol 12. The next drawing 910 of column 902 illustrates a configuration with 3 DM-RS symbols in the scheduling unit positioned at symbols 3, 6 and 12. The next drawing 915 of column 902 illustrates a configuration with 2 DM-RS symbols in the scheduling unit positioned at symbols 3 and 12. The last drawing 920 of column 902 illustrates a configuration with 4 DM-RS symbols in the scheduling unit positioned at symbols 3, 4, 11, and 12.

The second column 904 illustrates drawings 925, 930, and 935 showing different DM-RS configurations (based on the first DM-RS family locations {3,6,9,12}) for a downlink burst in a slot with a 2 symbol uplink burst (shown in symbols 12 and 13). The third column 906 illustrates drawings 940, 945, and 950 showing different DM-RS configurations (based on the first DM-RS family locations {3,6,9, 12}) for a downlink burst in a slot with a 3 symbol uplink burst (shown in symbols 11, 12 and 13). The fourth column 908 illustrates a drawing 955 showing a DM-RS configuration (based on the first DM-RS family locations {3,6,9, 12}) for a downlink burst in a slot with a 5 symbol uplink burst (shown in symbols 9-13). As can be appreciated from some of the illustrated configurations, at times, not all of the DM-RS positions of the family may be used but rather a subset of the predetermined DM-RS positions associated with the selected family may be used.

Figure 10:
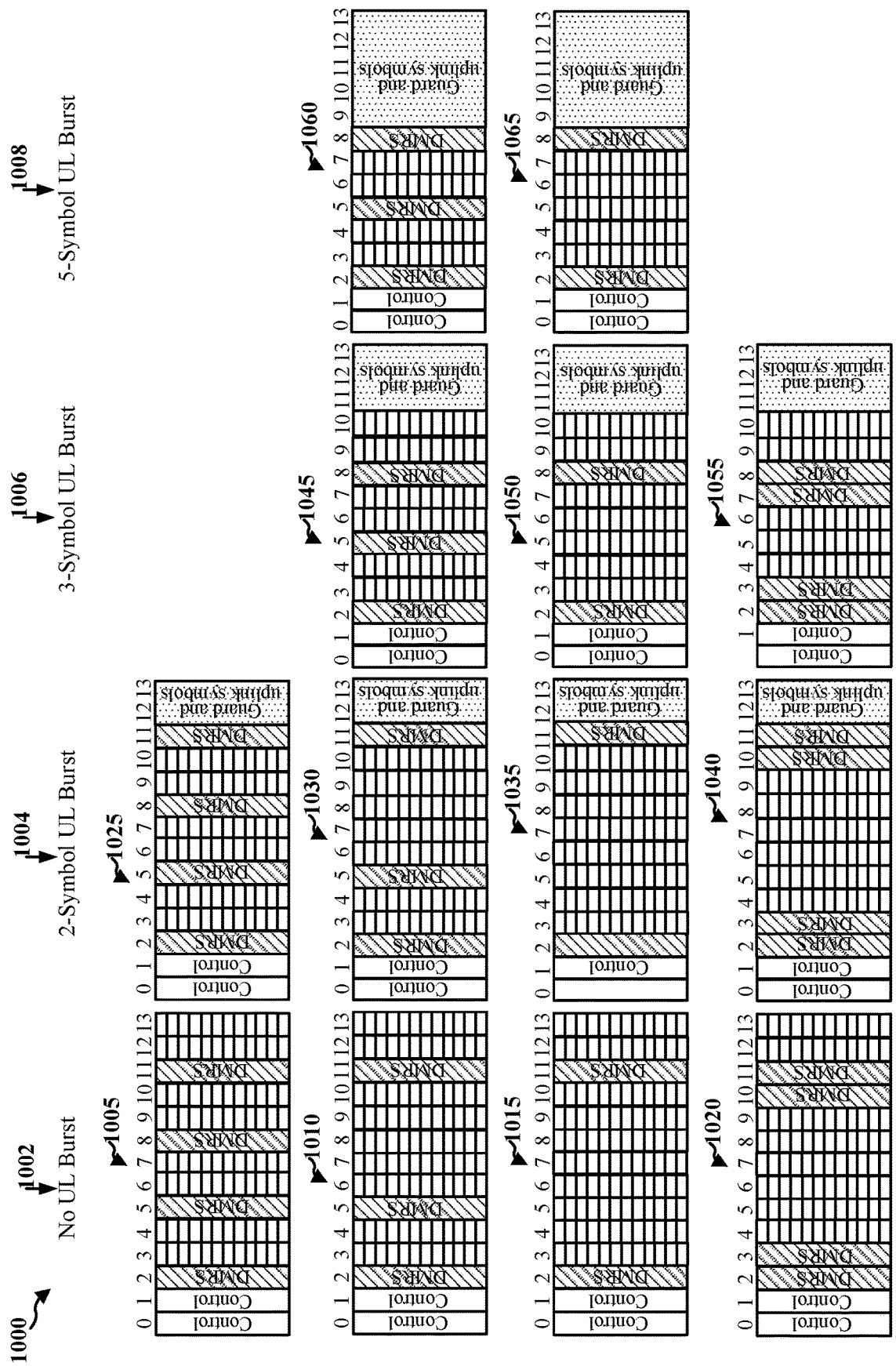
FIG. 10 illustrates several example drawings showing different DM-RS configurations for a scheduling unit of a channel based on a second family of DM-RS symbol locations.

FIG. 10 illustrates a diagram 1000 including several example drawings showing different DM-RS configurations for a downlink burst in a slot based on the second family of DM-RS locations represented as {2(3),5,8,11}. Each of the example configurations illustrated in FIG. 10 assume a downlink burst (e.g., scheduling unit of a DL channel) in a slot with 2 symbol downlink control block, e.g., 2 control symbols shown in symbol number 0 and 1 as shown in each of the example drawings.

The example drawings 1005, 1010, 1015, and 1020 in the first column 1002 show different DM-RS configurations (based on the second DM-RS family locations {2(3),5,8, 11}) for a scheduling unit of a downlink channel configured in a slot, with no uplink burst. As shown in drawing 1005, the DM-RS symbols are positioned based on the DM-RS locations associated with the second family represented as {2(3),5,8,11}. The first DM-RS symbol is positioned at symbol 2 (e.g., first symbol of the scheduling unit), then two midamble DM-RS symbols positioned at symbols 5 and 8, and the postamble DM-RS at symbol 11. The next drawing 1010 of column 1002 illustrates a configuration with 3 DM-RS symbols in the scheduling unit positioned at symbols 2, 5 and 11. The next drawing 1015 of column 1002 illustrates a configuration with 2 DM-RS symbols in the scheduling unit positioned at symbols 2 and 11. The last drawing 1020 of column 1002 illustrates a configuration with 4 DM-RS symbols in the scheduling unit positioned at symbols 2, 3, 10, and 11.

The example drawings 1025, 1030, 1035, and 1040 in the second column 1004 illustrate different DM-RS configurations (also based on the second DM-RS family locations {2(3),5,8,11}) for a scheduling unit of a downlink channel in a slot with a 2 symbol uplink burst (in symbols 12-13) multiplexed with the scheduling unit. The example drawings 1045, 1050, and 1055 in the third column 1006 illustrate different DM-RS configurations (also based on the second DM-RS family locations {2(3),5,8,11}) for a scheduling unit of a downlink channel configured in a slot with a 3 symbol uplink burst (in symbols 11-13). The example drawings 1060 and 1065 in the fourth column 1008 illustrates DM-RS configurations (based on the second DM-RS family locations {2(3),5,8,11}) for a scheduling unit of a downlink channel in a slot with a 5 symbol uplink burst (in symbols 9-13). As can be observed, in each illustrated example configuration, the location of the DM-RS symbols is based on the second family of DM-RS symbol locations, and some configurations may use only a subset of the DM-RS locations associated with the second family of DM-RS symbol locations.

Figure 11:
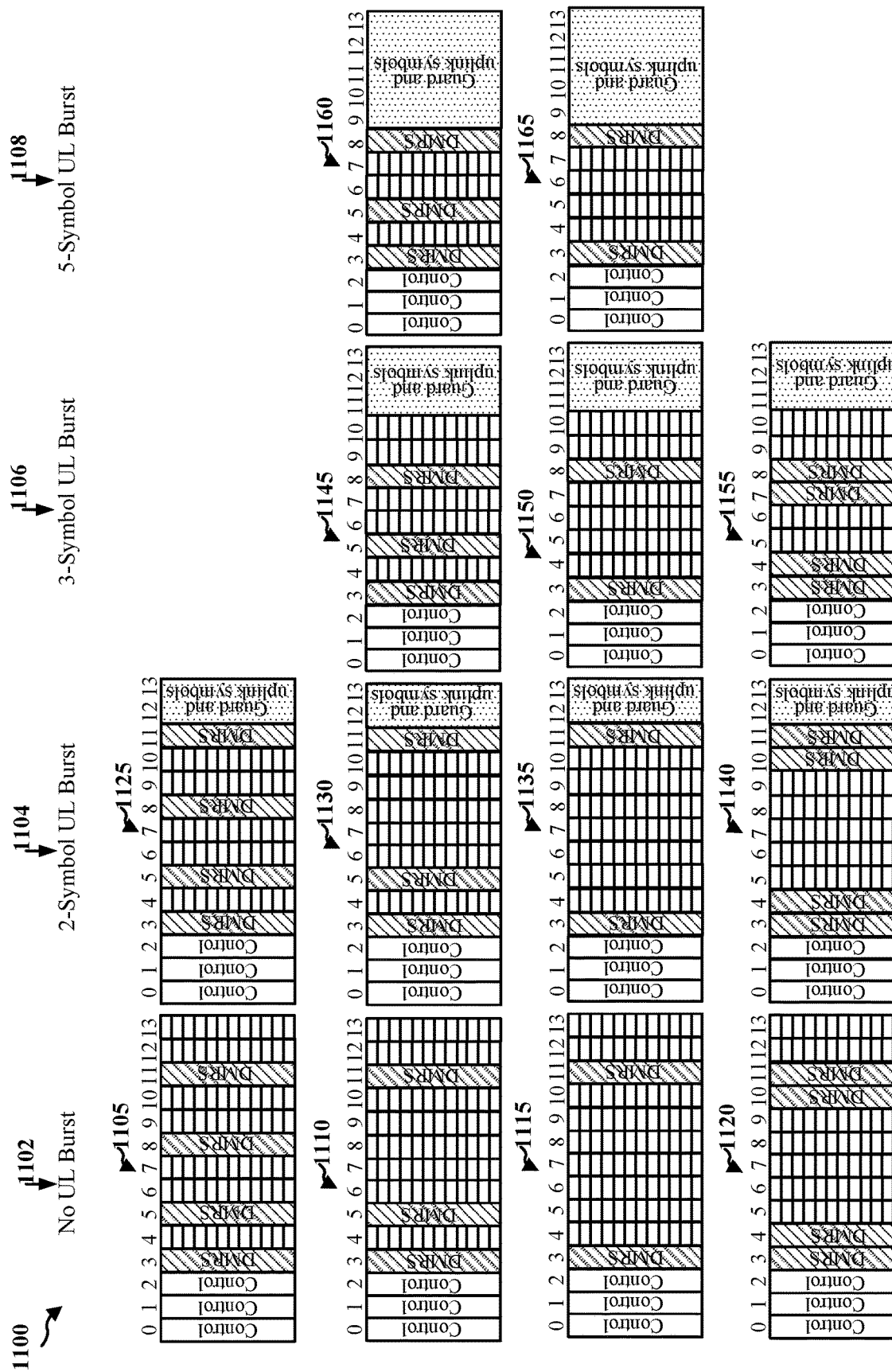
FIG. 11 illustrates different example DM-RS configurations, based on the second family of DM-RS symbol locations, for a scheduling unit of a channel configured in a slot with a 3 symbol downlink control block.

FIG. 11 illustrates a diagram 1100 showing different example DM-RS configurations, based on the second family of DM-RS locations {2(3),5,8,11}, for a downlink burst (e.g., scheduling unit of a DL channel) in a slot with a 3 symbol downlink control block. Similar to the FIG. 10 examples, various different possible DM-RS configurations based on the second DM-RS family locations {2(3),5,8,11} are illustrated in the drawings shown in columns 1102, 1104, 1106, and 1108. The example configurations illustrated in drawings 1105, 1110, 1115 and 1120 of the first column 1102 show different DM-RS configurations (based on the second DM-RS family locations {2(3),5,8,11}) for a scheduling unit of a downlink channel (e.g., PDSCH) configured in a slot with no uplink burst. For example, as shown in drawing 1105, the DM-RS symbols are positioned based on the DM-RS locations of the second family with the first DM-RS symbol positioned at symbol 3 (e.g., first symbol of the scheduling unit), then two midamble DM-RS symbols positioned at symbols 5 and 8, and the postamble DM-RS at symbol 11. The next drawing 1110 of column 1102 illustrates a configuration with 3 DM-RS symbols in the scheduling unit positioned at symbols 3, 5 and 11. The next drawing 1115 of column 1102 illustrates a configuration with 2 DM-RS symbols in the scheduling unit positioned at symbols 3 and 11. The last drawing 1120 of column 1102 illustrates a configuration with 4 DM-RS symbols in the scheduling unit positioned at symbols 3, 4, 10, and 11.

The example drawings 1125, 1130, 1135, and 1140 in the second column 1104 illustrate different DM-RS configurations (also based on the second DM-RS family locations {2(3),5,8,11}) for a scheduling unit of a downlink channel in a slot with a 2 symbol uplink burst (in symbols 12-13) multiplexed with the scheduling unit. The example drawings 1145, 1150, and 1155 in the third column 1106 illustrate different DM-RS configurations (also based on the second DM-RS family locations {2(3),5,8,11}) for a scheduling unit of a downlink channel configured in a slot with a 3 symbol uplink burst (in symbols 11-13). The example drawings 1160 and 1165 in the fourth column 1108 illustrates DM-RS configurations (based on the second DM-RS family locations {2(3),5,8,11}) for a scheduling unit of a downlink channel in a slot with a 5 symbol uplink burst (in symbols 9-13).

In accordance with an aspect of the disclosure, both the first family and second family of DM-RS locations may be supported. For example, depending on a deployment environment and/or scheduling unit size, the DM-RS configuration may be based on selection of one of the first or second families of DM-RS locations. For discussion purposes the first family of DM-RS locations is also referred to as family B: {2(3), 6, 9, 12}, while the second family is also referred to as family A: {2(3), 5, 8, 11}. In an aspect, for each deployment scenario, the best DM-RS pattern based on the available options (e.g., based on family A and family B) may be selected. The location of the front-load DM-RS symbol may be statically defined based on system bandwidth. The selected family of DM-RS symbol locations may be unique for different DL-burst durations to facilitate multi-user MIMO (MU-MIMO) pairing in a specific deployment scenario. In one configuration, a UE may be semi-statically signaled as to which DM-RS pattern (based on a corresponding DM-RS family A/B) to use for each slot structure. In a worst case scenario, the UE may have two families of possible DM-RS locations loaded in the memory, in the case where slots with up to two different UL-burst-size are dynamically configured. In one configuration, the UE may be signaled as to which DM-RS pattern (based on a corresponding DM-RS family A/B) is used (e.g., in a downlink channel) for each slot structure. The UE may use the same family of DM-RS locations for DM-RS symbols transmitted in an uplink channel or signaling may indicate a DM-RS family (selected by the base station) to be used by the UE.

Figure 12:
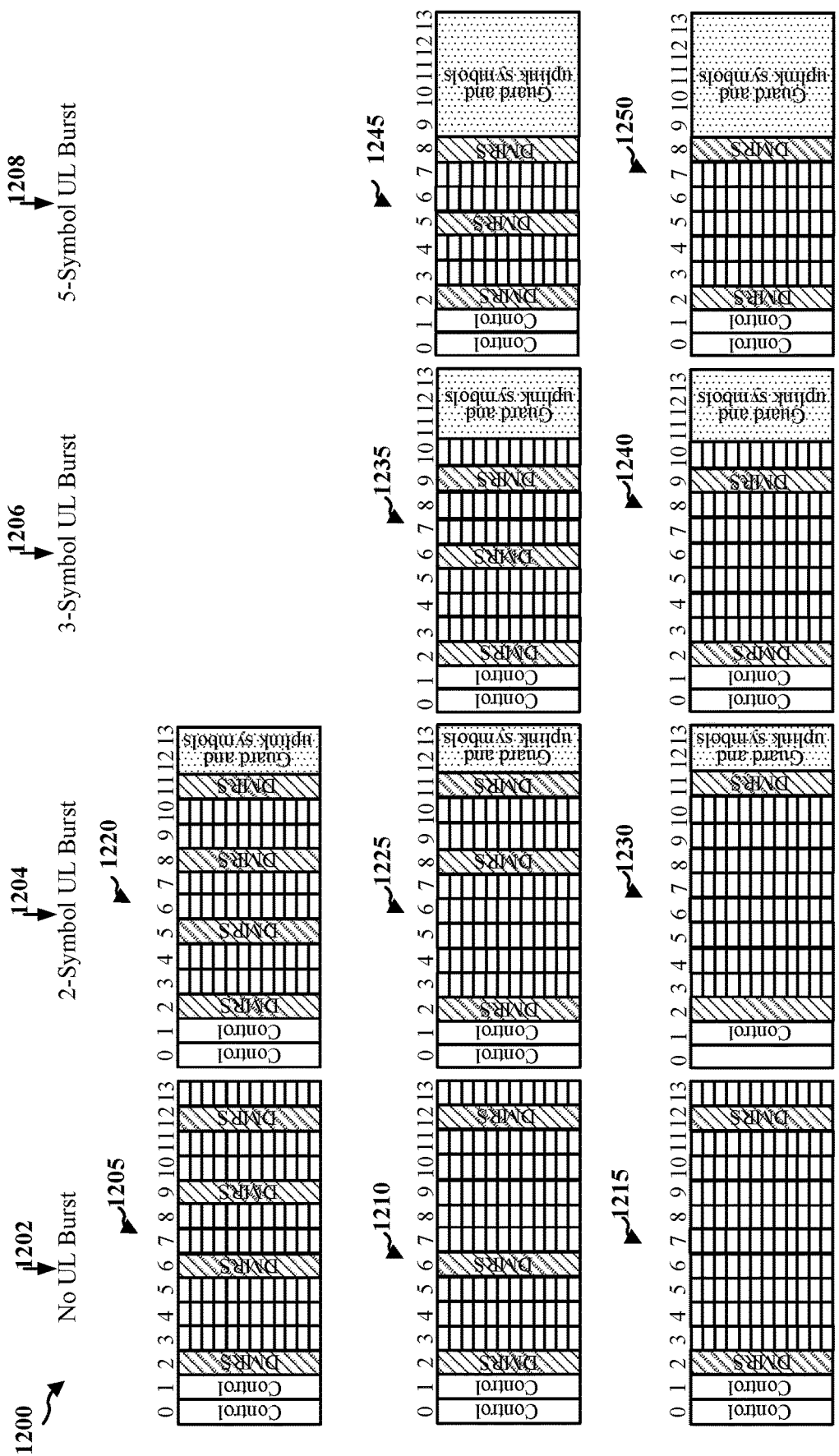
FIG. 12 illustrates several example drawings showing different DM-RS configurations for a scheduling unit of a channel in a slot with a 2 symbol control block, where the different configurations are based on one of the two families of DM-RS symbol locations.

FIG. 12 illustrates a diagram 1200 including several example drawings showing different DM-RS configurations for a downlink burst in a slot with a 2 symbol control block, where the different configurations are based on one of the two families (family A or family B) of DM-RS locations. In an aspect, for a given deployment scenario, one of the families A or B, is selected and the DM-RS symbol locations within a scheduling unit are based (at least partially) on the selected family. Different deployment scenarios may correspond to the different UL burst sizes shown in the drawings in columns 1202, 1204, 1206 and 1208. For each different uplink burst size, one DM-RS family (family A or family B) may be selected and the pattern/location of the DM-RS symbols in a downlink burst (e.g., scheduling unit of a downlink channel) are based on the selected family. From another perspective, a DM-RS family (family A or family B) may be selected based on the scheduling unit size (e.g., duration of scheduled data in the channel). For a downlink channel, the scheduling unit size may depend on, for example, an amount of data to be transmitted to a UE, slot structure, size of control block in a slot/mini-slot in which the channel is configured, whether data for multiple UEs is multiplexed within the same slot, etc.

The example drawings 1205, 1210, and 1215 in the first column 1202 show different DM-RS configurations for a scheduling unit of a downlink channel configured in a slot with no uplink burst based on the selection of DM-RS family B: {2(3), 6, 9, 12}. For example, drawing 1205 illustrates an example configuration based on DM-RS family B for a scheduling unit of a downlink channel configured in a slot with no uplink burst, e.g., where the slot in which the downlink channel is configured does not have any uplink data or guard symbols. As shown, the DM-RS symbols are positioned in symbols 2, 6, 9 and 12 in accordance with the predetermined DM-RS locations for family B. In such an example case where the scheduling unit is configured in a slot including 2 symbol control block but without an uplink burst, family B (i.e., first family of DM-RS symbol location: {2, 6, 9, 12}) may be selected because in such a deployment using the pattern/DM-RS locations corresponding to family B may provide the maximum benefit in terms of improved system performance. Drawing 1210 illustrates another example configuration based on the DM-RS family B for a downlink scheduling unit in a slot with no uplink burst. In this configuration, the DM-RS symbols are positioned in symbols 2, 6, and 12. Yet another example configuration based on the DM-RS family B for a downlink scheduling unit in a slot with no uplink burst is illustrated in drawing 1215. In this configuration, the DM-RS symbols are positioned in symbols 2 and 12.

Another deployment scenario may correspond to a 2 symbol uplink burst case as shown in the example drawings of column 1204 which illustrate different DM-RS configurations (in drawings 1220, 1225, and 1230) based on the selection of DM-RS family A: {2, 5, 8, 11} for a scheduling unit of a downlink channel configured in a slot with a 2 symbol uplink burst (shown in symbols 12 and 13 of the slot). In each of the illustrated example configurations, the DM-RS positioning in the scheduling unit is based on the DM-RS locations associated with family A (i.e., second family of DM-RS symbol location: {2, 5, 8, 11}). For example, in the cases where a 2 symbol UL burst is multiplexed with a scheduling unit of a DL channel in the slot, using the DM-RS pattern corresponding to family A may prove more beneficial for improving system performance.

Figure 13:
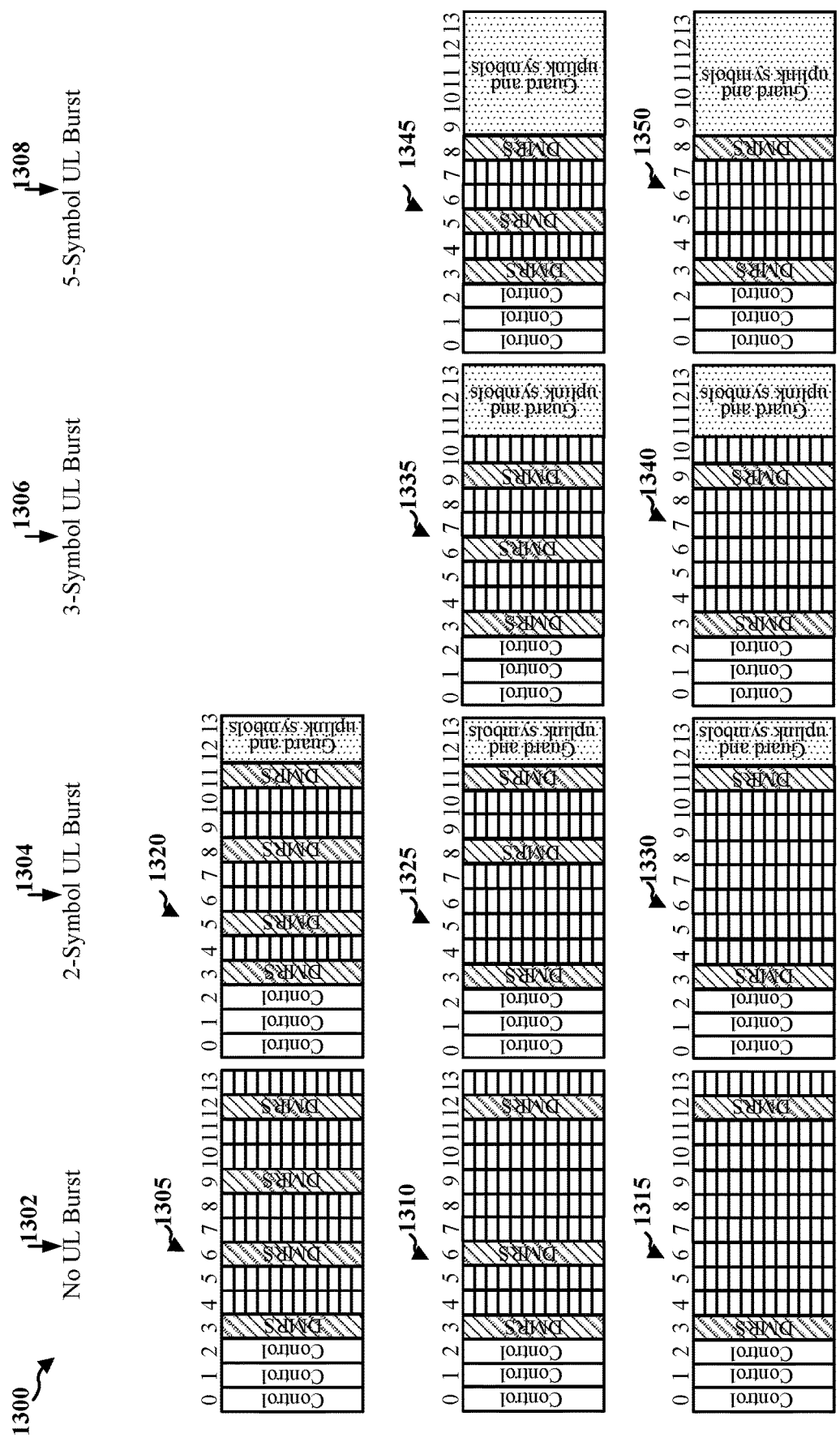
FIG. 13 illustrates several example drawings showing different DM-RS configurations for a scheduling unit in a slot with a 3 symbol control block, where the different configurations are based on one of the two families of DM-RS symbol locations.

The example drawings 1235 and 1240 of column 1206 show different DM-RS configurations based on the selection of family B: {2, 6, 9, 12} for a scheduling unit of a downlink channel configured in a slot with a 3 symbol uplink burst. The last illustrated deployment scenario corresponds to a 5 symbol uplink burst case shown in the example drawings 1245 and 1250 of column 1208 which illustrate different DM-RS configurations based on the selection of DM-RS family A: {2, 5, 8, 11} for a scheduling unit of a downlink channel configured in a slot with a 5 symbol uplink burst (shown in symbols 9-13). Thus, in some cases where a 5 symbol UL burst is multiplexed with a scheduling unit of a DL channel in the slot, using the DM-RS pattern corresponding to family A may prove more beneficial for improving system performance FIG. 13 illustrates a diagram 1300 including several example drawings showing different DM-RS configurations for a scheduling unit of a downlink channel configured in a slot with a 3 symbol control block (shown in symbols 0-2), where the different configurations are based on the selection of one of the two DM-RS families (family A or family B) of DM-RS locations. Again, as discussed supra, for a given UL burst size, one of the families A or B may be selected and the DM-RS symbols may be positioned based on the selected family. As shown, a first deployment scenario may correspond to a slot where a scheduling unit for a downlink channel is multiplexed a 3 symbol control block but without an uplink burst, as shown in the example drawings 1305, 1310, and 1315 of column 1302. For example, drawing 1305 illustrates an example configuration based on selection of DM-RS family B: {2(3), 6, 9, 12} for a scheduling unit of a downlink channel in a slot without an uplink burst. As shown, in this case the DM-RS symbols are positioned in symbols 3, 6, 9 and 12 in accordance with the predetermined DM-RS locations for family B. In such a case where the slot may have a 3 symbol control block in addition to the scheduling unit but no uplink signaling, family B: {3, 6, 9, 12} of DM-RS locations may be selected because using the pattern corresponding to family B may provide the maximum benefit in terms of improved system performance. Drawing 1310 illustrates another example configuration based on the DM-RS family B for a downlink scheduling unit in a slot with no uplink burst. In this configuration, the DM-RS symbols are positioned in symbols 3, 6, and 12. Yet another example configuration based on the DM-RS family B for a downlink scheduling unit in a slot with no uplink burst is illustrated in drawing 1315. In this configuration, the DM-RS symbols are positioned in symbols 3 and 12.

A second deployment scenario may correspond to a case where a 2 symbol uplink burst may be multiplexed with a scheduling unit in a slot that also includes the 3 symbol control block as shown in the example drawings 1320, 1325, and 1330 of column 1304. In each of the illustrated example configurations shown in drawings 1320, 1325, and 1330, the DM-RS positioning in the scheduling unit is based on the DM-RS locations associated with family A: {3, 5, 8, 11}. For example, in the cases where a 2 symbol UL burst is multiplexed with a scheduling unit of a DL channel in the slot including a 3 symbol control block, using the DM-RS pattern corresponding to family A may prove more beneficial for improving system performance.

Similarly, in some other deployment scenarios one of the DM-Rs families may be selected. For example, drawings 1335 and 1340 of column 1306 show different DM-RS configurations based on the selection of family B: {3, 6, 9, 12} for a scheduling unit of a downlink channel configured in a slot with a 3 symbol uplink burst (e.g., uplink burst size of 3 symbols as shown in symbols 11-13). Another example illustrated in drawings 1345 and 1350 of column 1308 that show different DM-RS configurations based on the selection of family A: {3, 5, 8, 11} for a scheduling unit of a downlink channel configured in a slot including a 5 symbol uplink burst (e.g., uplink burst size of 5 symbols as shown in symbols 9-13).

In some configurations, different families may be used for UL and DL scheduling units. In one configurations, for sidelink, a UE may be configured to transmit/receive with either the DL or UL family of DM-RS locations. Different techniques and/or variations of the above discussed techniques may be used for slot-based and mini-slot-based scheduling. Different techniques and/or variations of the above discussed techniques may be used for scenarios that have the front-load DM-RS position fixed with respect to the data scheduling unit or with respect to the slot start. For example, in some such cases the locations for additional DM-RS symbols (other than the fixed front-load DM-RS position) may be selected based on one of the families.

In yet another aspect of the disclosure, DM-RS symbols may be transmitted every X symbols, where X may be chosen from, e.g., {3,4,5}. That is, the DM-RS configuration may be such that the distance/spacing between consecutive DM-RS symbols in a slot/scheduling unit may be {N*X−1} symbols, where N is a positive integer. For example, in the case where X is chosen to be 3 (e.g., DM-RS symbols transmitted every 3 symbols) and with N=1, the distance/spacing between consecutive DM-RS symbols in the slot/scheduling unit may be 2. When X is chosen to be 4 (e.g., DM-RS symbols transmitted every 4 symbols) the distance/spacing between consecutive DM-RS symbols in the slot/scheduling unit may be 3. Such a configuration where the DM-RS is transmitted based on a chosen value of X may significantly facilitate UE processing and channel estimation procedures. Non-uniformities may lead to sub-optimal performance, in general. In accordance with an aspect, a UE may be semi-statically configured for each slot-type (e.g., based on SFI), the number of DM-RS symbols in the slot and the distance between the possible DM-RS symbols. For example, for various slot types (e.g., slot with 2/3 symbol control block and no uplink burst/2 symbol uplink burst/3 symbol uplink burst/5 symbol uplink burst etc.) the UE may be configured (e.g., signaled or pre-stored) the value of "X" used for DM-RS configuration in a downlink scheduling unit and a number of DM-RS symbols (e.g., 2, 3, or 4) used in the scheduling unit. In some configuration, the UE may use the same X and/or the configured number of DM-RS symbols in a scheduling unit of an uplink channel (e.g., PUSCH), e.g., for its uplink and/or sidelink transmissions.

Figure 14:
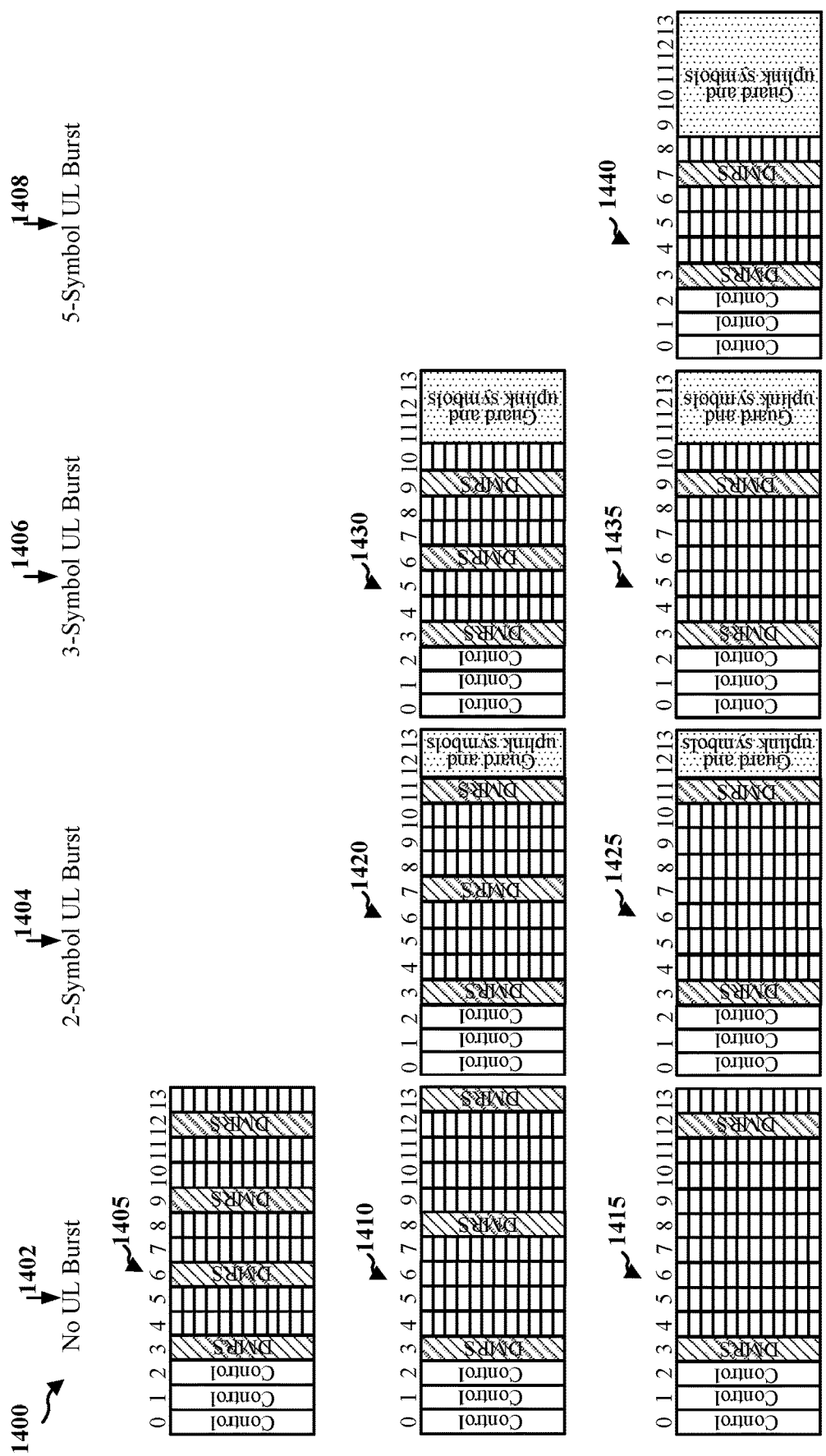
FIG. 14 illustrates several different example DM-RS configurations for a scheduling unit of a downlink channel, where the DM-RS symbol locations are set according to a set number of symbols.

FIG. 14 is a diagram 1400 illustrating several different example DM-RS configurations for a scheduling unit of a downlink channel in a slot where the DM-RS symbols may be transmitted every X symbols in accordance with a set value of X. As discussed above, with this approach the DM-RS symbols may be transmitted at symbol locations spaced apart according to a predetermined number of symbols. The basic slot that comprises the scheduling unit of the downlink channel used in the examples of FIG. 14 includes a 3-symbol downlink control block that occupies symbol number 0, 1 and 2. As discussed above, in an aspect the DM-RS symbols may be positioned every X symbols in the scheduling unit, where X may be chosen from, e.g., {3,4,5}. That is, the distance/spacing between consecutive DM-RS symbols in a scheduling unit may be based on a value of X chosen for a given configuration. For example, with X={3, 4,5}, the distance/spacing between consecutive DM-RS symbols in the scheduling unit may be 2 symbols, 3 symbols, 4 symbols, or another number of symbols determined based in the number X as illustrated in FIG. 14 and discussed infra.

In FIG. 14, the example drawings 1405, 1410, 1415 in the first column 1402 show three different DM-RS configurations for a downlink burst (downlink scheduling unit) in a slot with a 3 symbol control block (symbols 0-2) but without an uplink burst (e.g., no uplink symbols in the slot). The first example configuration shown in drawing 1405 of column 1402 illustrates a case with X=3, e.g., with DM-RS symbols being transmitted every 3 symbols in the slot. As can be observed in the first configuration of column 1402, the DM-RS symbols are transmitted in the symbols with index 3, 6, 9 and 12, e.g., showing a DM-RS transmission every 3 symbols. The distance/spacing between consecutive DM-RS symbols in the slot/scheduling unit in this case is 2 (i.e., X−1). Thus, as can be appreciated, the DM-RS symbols are spaced apart according to a set value of X, which in the first example is 3. For downlink, a base station (e.g., base station 180/310) may choose the value of X based on, for example slot type/configuration, size/duration of the scheduling unit within the slot/mini-slot, deployment environment, etc. In some configurations, X may be chosen randomly from the set of possible values {3,4,5}.

The second example configuration shown in drawing 1410 of column 1402 illustrates a case with X=5, e.g., with DM-RS symbols being transmitted every 5 symbols in the slot. As can be observed in the second configuration of column 1402, the DM-RS symbols are transmitted in the symbols with index 3, 8, and 13, e.g., showing a DM-RS transmission every 5 symbols. The distance/spacing between consecutive DM-RS symbols in the slot/scheduling unit in this case is 4 (i.e., X−1). The third example configuration shown in drawing 1415 of column 1402 illustrates a case with X=3, e.g., where DM-RS symbols may be transmitted every 3 symbols. However, in the third configuration shown in drawing 1415 is a special case with X=3 because there is no DM-RS transmission on the symbols with index 6 and 9 even though for the given slot structure, based on X=3 a DM-RS symbol is transmitted every $3^{rd}$ symbol. In the third configuration, following the first DM-RS transmission, the next DM-RS transmission is at 3X, e.g. on the symbol with symbol index 12. In this case it may be observed that the distance/spacing between consecutive DM-RS symbols in the scheduling unit is ={3X−1}, i.e., 8 symbols. While depending on the condition and given scenario the transmitting device (e.g., base station in case of downlink) may not transmit DM-RS symbol on all allowed locations associated with X=3 configuration, still the configuration allows DM-RS transmission every 3 symbols in this case. A receiving device, e.g., a UE, may be preconfigured or signaled about the DM-RS configuration and may know where to expect the DM-RS for a given slot type. For example, the UE may be preconfigured or signaled the set number of symbols (e.g., X) for a spacing between the DM-RS symbols and the number of DM-RS symbols transmitted in a scheduling unit.

The example drawings 1420, and 1425 in the second column 1404 show two different DM-RS configurations for a scheduling unit of downlink channel in a slot with a 2 symbol uplink burst. Both example configurations shown in column 1404 illustrate a case with X=4, e.g., where DM-RS symbols may be transmitted every 4 symbols in the slot. However, unlike the first configuration illustrated in drawing 1420, in the second example configuration illustrated in drawing 1425, there is no DM-RS transmission on the symbol with index 7. Again, this may considered a special case for a slot with a 2 symbol uplink burst. In the second configuration, following the first DM-RS transmission (at symbol 3), the next DM-RS transmission at 2X, e.g., on the symbol with symbol index 11. In this case the distance/spacing between consecutive DM-RS symbols in the scheduling unit is ={2X-1}, i.e., 7 symbols.

The example drawings 1430 and 1435 in the third column 1406 show different DM-RS configurations for a scheduling unit of a downlink channel configured in a slot with a 3 symbol uplink burst. Both example configurations shown in column 1406 illustrate a case with X=3, e.g., where DM-RS symbols may be transmitted every 3 symbols in the slot. However, unlike the example configuration shown in drawing 1430 where a DM-RS symbol is transmitted every 3$^{rd}$ symbol in the scheduling unit, in the configuration shown in drawing 1435 includes transmission of only 2 DM-RS symbols in the scheduling unit. The example drawing 1440 in the last column 1408 shows a DM-RS configuration for a scheduling unit in a slot with a 5 symbol uplink burst. The example configuration shown in drawing 1440 illustrates a case with X=4 e.g., where DM-RS symbols may be transmitted every 4 symbols in the scheduling unit and the distance/spacing between consecutive DM-RS symbols in the scheduling unit is 3 symbols. In this case, based on the slot structure and/or size of the uplink burst in the slot, only 2 DM-RS symbols may be transmitted within the scheduling unit based on X=4.

Figure 15:
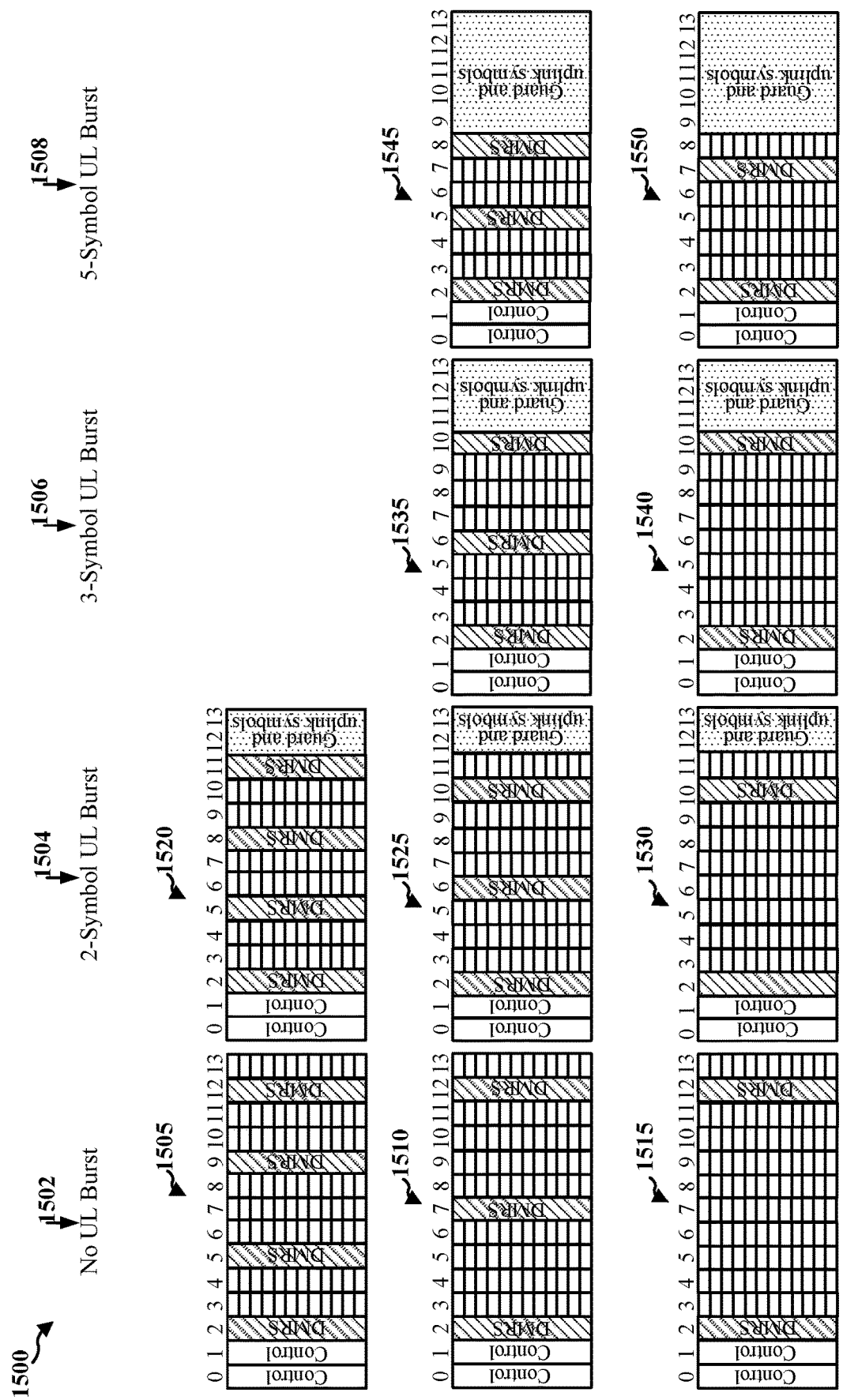
FIG. 15 illustrates another example showing several different example DM-RS configurations for a scheduling unit of a downlink channel in a slot with a 2-symbol downlink control block, where the DM-RS symbols may be transmitted at symbol locations spaced apart according to a set number of symbols.

FIG. 15 is a diagram 1500 illustrating several different example DM-RS configurations for a downlink scheduling unit (DL burst) in a slot with a 2-symbol downlink control block, where the DM-RS symbols may be transmitted every X symbols in accordance with a set value of X. As discussed above, the DM-RS symbols may be transmitted at symbol locations spaced apart by a predetermined number of symbols based on the selected value of X. The examples shown in FIG. 15 are similar to those in FIG. 14 and follow the same concept that DM-RS symbols may be transmitted every X symbols (e.g., X={3,4,5}) in the scheduling unit as discussed above in detail.

Various different example configurations are illustrated in the drawings 1505, 1510, 1515, 1520, 1525, 1530, 1535, 1540, 1545, and 1550 shown in columns 1502, 1504, 1506, and 1508 which may be simply understood by following the above discussion related to FIG. 14. However, one exception to the rule of DM-RS transmission every X symbols is the case illustrated in drawing 1505 where 4 DM-RS symbols are transmitted. In this particular case, the slot including the downlink scheduling unit may be assumed partitioned in two halves, e.g., a first half from symbols 0 to 6 and a second half from symbols 7 to 13. With this assumption, the same rule of DM-RS transmission every X symbols may be applied individually to each partition. Thus, in the first example configuration shown in drawing 1505, in the first half of the slot, the DM-RS symbols are transmitted every X=3 symbols. The spacing between the two DM-RS symbols in the first half of the slot is 2 symbols. Similarly, in the second half of the slot (starting from symbol 7), the DM-RS symbols are transmitted every 3 symbols and the spacing between the two DM-RS symbols is 2 symbols with the first DM-RS symbol in the second half being positioned at symbol 9 (after the first two symbols similar to the first half) as can be observed.

The example configuration shown in drawing 1510 of column 1502 illustrates a case with X=5, e.g., with DM-RS symbols being transmitted every 5 symbols in the slot. As can be observed in drawing 1510, the DM-RS symbols are transmitted in the symbols with index 2, 7, and 12, e.g., showing a DM-RS transmission every 5 symbols. The distance/spacing between consecutive DM-RS symbols in the slot/scheduling unit in this case is 4 (i.e., X-1). The example configuration shown in drawing 1515 of column 1502 illustrates a case with X=5, e.g., where DM-RS symbols may be transmitted every 5 symbols. However, this configuration may be considered a special case with X=5 because there is no DM-RS transmission on the symbol 7 which would otherwise be present based on X=5. In this configuration, following the first DM-RS transmission, the next DM-RS transmission is at 2X, e.g. on the symbol with symbol index 12. In this case it may be observed that the distance/spacing between consecutive DM-RS symbols in the scheduling unit is ={2X-1}, i.e., 9 symbols. Various remaining example configurations illustrated in columns 1504, 1506, and 1508 may be simply understood by following the above discussion related to drawings 1505, 1510, 1515, and the discussion of FIG. 14.

Figure 16:
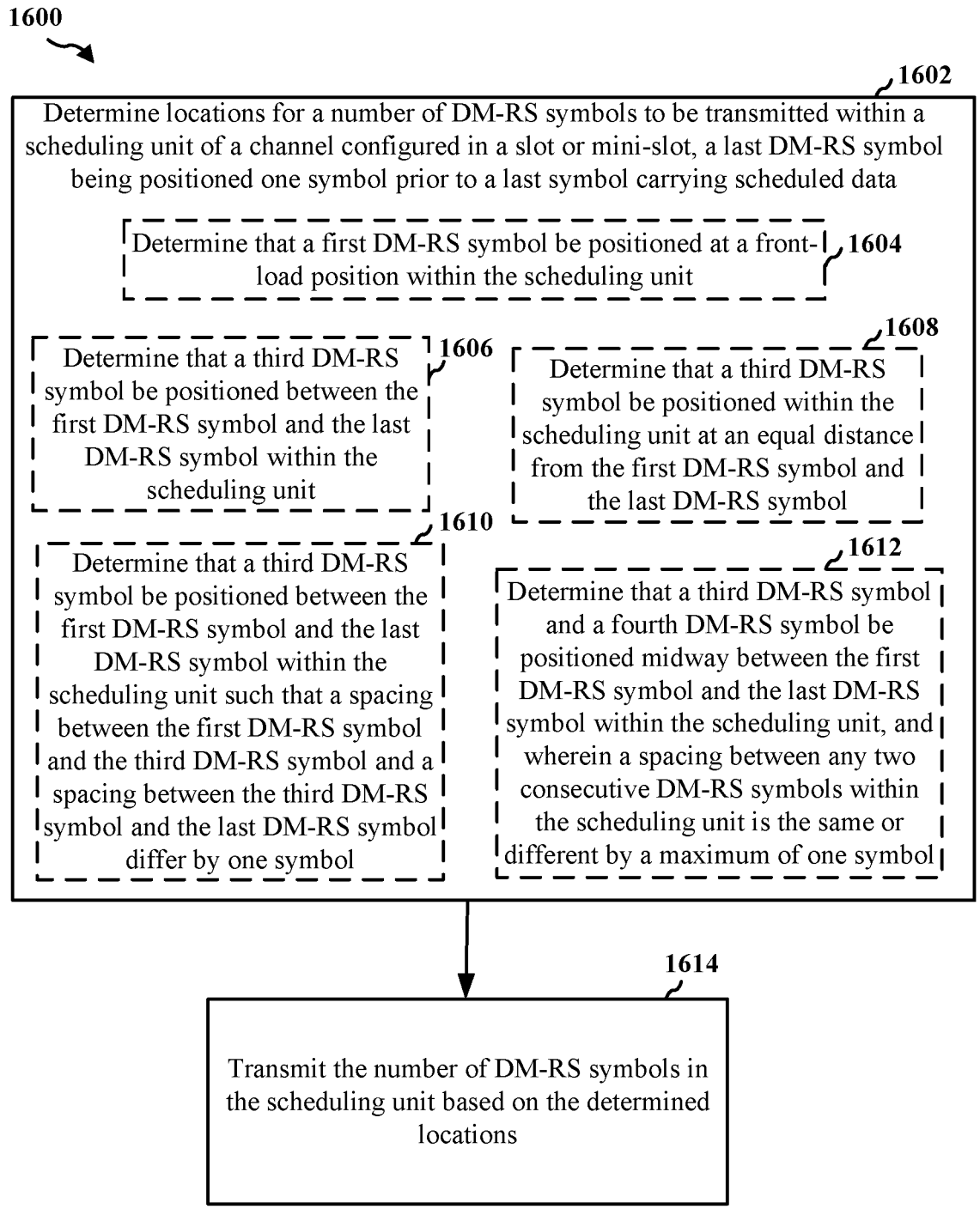
FIG. 16 is a flowchart of a method of wireless communication.

FIG. 16 is a flowchart 1600 of an example method of wireless communication. The method may be performed by an apparatus, e.g., a UE (such as UE 104/350), a base station (such as base station 102/180/310), or the apparatus 1902/1902'.

At 1602, the apparatus may determine locations for a number of DM-RS symbols to be transmitted in a scheduling unit of a channel included within a slot or a mini-slot. For example, determining locations of DM-RS symbols to be transmitted in a scheduling unit of a channel may refer to determining the symbol positions within the scheduling unit of an uplink/downlink channel for transmitting the DM-RS sequences. In accordance with one aspect, as part of determining the locations for the DM-RS symbols, the apparatus may be configured to determine that a last DM-RS symbol, also referred to as a postamble DM-RS in connection with FIGS. 4-7, is to be positioned one symbol prior to a last symbol carrying scheduled data in the scheduling unit. As discussed supra in connection with FIGS. 4-7, in accordance with one feature, the last DM-RS symbol in a scheduling unit of a channel within a slot or mini-slot may be positioned one symbol prior to the last symbol carrying scheduled data. For example, with reference to drawing 405 of FIG. 4 that shows a 14 symbol slot in which a scheduling unit 407 of a downlink channel (e.g., PDSCH) is configured, the last DM-RS symbol is positioned in symbol 12 which is one symbol prior to the last symbol (symbol with index 13) carrying scheduled data.

As discussed supra, in accordance with one aspect, the apparatus may determine the locations and/or a maximum number of DM-RS symbols to be transmitted in a scheduling unit based on one or more of a size/duration of the scheduling unit, a number of control symbols in the slot or mini-slot, a number of guard symbols in the slot or mini-slot, a number of symbols carrying scheduled data, and a deployment environment. In some configurations, the locations and/or the number of DM-RS symbols to be transmitted in a scheduling unit of a downlink channel (e.g., PDSCH) configured in a slot or mini-slot may be further based on a size/duration of an uplink burst that may be included in the slot or mini-slot. Similarly, in some configurations, the locations and/or the number of DM-RS symbols to be transmitted in a scheduling unit of an uplink channel (e.g., PUSCH) configured in a slot or mini-slot may be further based on a size/duration of a downlink burst that may be included in the slot or mini-slot.

In some configurations, as part of the operation at 1602 of determining the locations for the DM-RS symbols to be transmitted in the scheduling unit of a channel included within a slot or a mini-slot, the apparatus may perform one or more sub-operations illustrated in blocks 1604, 1606, 1608, 1610, and 1612. Some of the sub-operations may be performed in combination while some other sub-operations may be alternatives of another sub-operation. For example, in one configuration, as part of determining the locations for the DM-RS symbols to be transmitted in the scheduling unit, at 1604 the apparatus may determine that a first DM-RS symbol be positioned at a front-load position within the scheduling unit. For example, as discussed in connection with FIGS. 4-7, the apparatus may determine the location of the first DM-RS symbol to be the front load position. The front load position for a DM-RS symbol may be well defined, e.g., a symbol position early within the scheduling unit or close to the start of the scheduling unit. For example, with reference to drawing 405 of FIG. 4, the front load position may be the symbol positions corresponding to symbols 2 or 3 which are right after the control symbols 0 and 1 which are not part of the scheduling unit. In the example configuration of drawing 405, the apparatus may determine that the first DM-RS be positioned at symbol 2 (i.e., front load DM-RS position). In one configuration, as part of determining the locations for the DM-RS symbols to be transmitted in the scheduling unit, at 1606, the apparatus may further determine that a third DM-RS symbol be positioned between the first DM-RS symbol and the last DM-RS symbol within the scheduling unit. For example, with reference to drawing 405 of FIG. 4, a third DM-RS may be the DM-RS symbol positioned at symbol 6 or symbol 9, that is positioned between the first DM-RS symbol (at symbol 2) and the last DM-RS symbol (symbol 12). In another example, with reference to drawing 410 of FIG. 4, the third DM-RS may be the DM-RS symbol positioned at symbol 7 between the first DM-RS symbol (at symbol 2) and the last DM-RS symbol (symbol 12).

In one configuration, as part of determining the locations for the DM-RS symbols to be transmitted in the scheduling unit, at 1608, the apparatus may determine that a third DM-RS symbol be positioned within the scheduling unit at an equal distance from the first DM-RS symbol and the last DM-RS symbol. For example, with reference to drawing 410 of FIG. 4, the third DM-RS may be positioned at symbol 7 which is at an equal distance/spacing from the first DM-RS symbol (at symbol 2) and the last DM-RS symbol (at symbol 12) in the scheduling unit.

In one configuration, as part of determining the locations for the DM-RS symbols to be transmitted in the scheduling unit, at 1610, the apparatus may determine that a third DM-RS symbol be positioned between the first DM-RS symbol and the last DM-RS symbol within the scheduling unit such that a spacing between the first DM-RS symbol and the third DM-RS symbol and a spacing between the third DM-RS symbol and the last DM-RS symbol differ by one symbol. For example, with reference to the DM-RS configuration shown in drawing 445 of FIG. 4, the third DM-RS may be positioned at symbol 6 between the first DM-RS symbol (at symbol 2) and the last DM-RS symbol (at symbol 9). As can be observed, in such a configuration, a spacing between the first DM-RS symbol and the third DM-RS symbol and a spacing between the third DM-RS symbol and the last DM-RS symbol differs by one symbol.

In one configuration, as part of determining the locations for the DM-RS symbols to be transmitted in the scheduling unit, at 1612, the apparatus may determine that a third DM-RS symbol and a fourth DM-RS symbol be positioned midway between the first DM-RS symbol and the last DM-RS symbol within the scheduling unit such that a spacing between any two consecutive DM-RS symbols within the scheduling unit is the same or different by a maximum of one symbol. For example, as illustrated in the various DM-RS configurations shown in FIGS. 4-7, in a 4 DM-RS symbol scheduling unit, the third DM-RS symbol and a fourth DM-RS symbol (e.g., midamble DM-RS symbols) may be positioned midway between the first DM-RS symbol and the last DM-RS symbol within the scheduling unit such that a spacing between any two consecutive DM-RS symbols within the scheduling unit is the same or different by a maximum of one symbol.

In some configurations, the determined locations and/or a number of DM-RS symbols to be transmitted in a scheduling unit may be based on whether frequency hopping is employed within the scheduling unit (e.g., within the duration of the scheduled data). For example, as discussed supra in connection with FIG. 7, use of frequency hopping may affect the locations where the DM-RS symbols may be positioned within the scheduling unit. In one such configuration, when frequency hopping is employed within the scheduling unit, the apparatus may (e.g., as part of the operation at 1602) determine a same pattern of DM-RS positions for each frequency hop within the scheduling unit. For example, with reference to FIG. 7, a same pattern of DM-RS positions is determined for each portion of the scheduling unit 705, e.g., before and after the frequency hop.

At 1614, the apparatus may transmit the number of DM-RS symbols in the scheduling unit based on the determined locations (e.g., as determined at 1602). In some configurations, a first DM-RS symbol in the scheduling unit, also referred to as the preamble symbol, may be transmitted at a front load position. In some configurations, a last DM-RS symbol, also referred to as the postamble symbol, may be transmitted at a symbol location that is one symbol before the last symbol carrying scheduled data. In some configurations, a duration of the scheduling unit may be smaller than 14 symbols. For example, as illustrated in drawing 405, the scheduling unit 407 may be configured in a 14 symbol slot that also includes a 2 symbol control block. In such configurations, the duration of the scheduling unit may be smaller than 14 symbols. In some other configurations, a duration of the scheduling unit may be equal to 14 symbols. For example, as illustrated in drawing 605, the scheduling unit 607 may be configured in a 14 symbol slot and may occupy the 14 symbols.

In one configuration, the apparatus implementing the method of flowchart 1600 is a base station. In one such configuration, the channel is PDSCH. In one configuration, the apparatus implementing the method of flowchart 1600 is a UE. In one such configuration, the channel is PUSCH.

Figure 17:
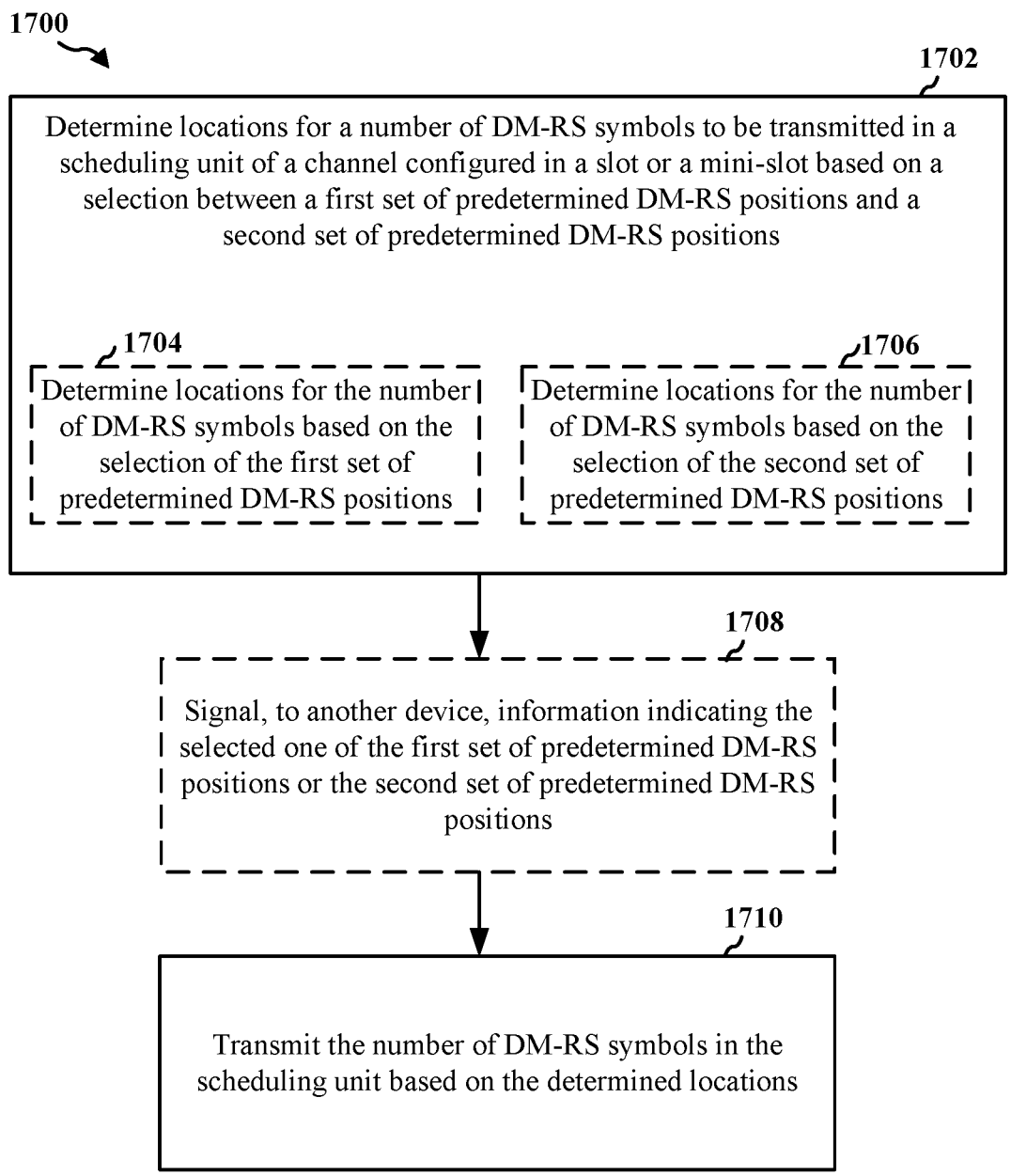
FIG. 17 is a flowchart of another method of wireless communication.

FIG. 17 is a flowchart 1700 of another example method of wireless communication, in accordance with one aspect of the disclosure. The method of flowchart 1700 may be performed by an apparatus, e.g., a UE (such as UE 104/350), a base station (such as base station 102/180/310), or the apparatus 1902/1902'.

At 1702, the apparatus may determine locations for a number of DM-RS symbols to be transmitted within a scheduling unit of a channel included in a slot or mini-slot based on a selection between a first set of predetermined positions and a second set of predetermined DM-RS positions. As discussed supra in connection with FIGS. 8-13, the first and second set of predetermined positions may each define a set of possible symbol locations (e.g., in a slot) that may carry DM-RS symbols. For example, as discussed supra, the first set of predetermined positions may be the first family of DM-RS symbol locations (also referred to as family B) represented as {2(3),6,9,12}, and the second set of predetermined positions may be the second family of DM-RS symbol locations (also referred to as family A) represented as {2(3),5,8,11}. In some configurations, the apparatus may be a base station (e.g., base station 180/310) that may select between the first set of predetermined positions and the second set of predetermined DM-RS positions may be based on one or more of a deployment environment (e.g., high/low mobility conditions, high/low device density environment, etc.), a size/duration of an uplink burst within the slot or mini-slot (e.g., number of symbols of UL signaling in a slot/mini-slot carrying downlink channel scheduling unit), and size/duration of a scheduling unit within the slot or mini-slot (e.g., number of symbols carrying scheduled data). In some other configurations, the selection between the first set of predetermined positions and the second set of predetermined DM-RS positions may be a random selection. In some configurations where the apparatus is a UE (e.g., UE 104), the selection between the first set of predetermined positions and the second set of predetermined DM-RS positions may be based on configuration/signaling from the base station. For example, the base station may signal the UE which one out of the two families (A or B) to use for positioning DM-RS symbols in an uplink scheduling unit. Thus, in such a case, the UE may determine the locations for a number of DM-RS symbols to be transmitted within an uplink scheduling unit of a PUSCH configured in a slot or mini-slot based on the configuration from the base station.

In various configurations, as part of the operation at 1702 of determining the locations for the DM-RS symbols, the apparatus may perform one of the sub-operations illustrated in blocks 1704 or 1706. For example, in one configuration, as part of determining the locations for the DM-RS symbols to be transmitted in the scheduling unit, at 1704 the apparatus may determine locations for the number of DM-RS symbols based on the selection of the first set of predetermined positions of DM-RS symbols. For example, with reference to drawing 805 of FIG. 8, the apparatus may select the first set of predetermined positions (e.g., first family/family B: {2(3),6,9,12}) and position the DM-RS symbols to be transmitted based on the predetermined positions (e.g., at symbols 2,6,9,12) corresponding to the selected first set of predetermined positions. In one configuration, as part of determining the locations for the DM-RS symbols to be transmitted in the scheduling unit, at 1706 the apparatus may determine locations for the number of DM-RS symbols based on the selection of the second set of predetermined positions of DM-RS symbols. For example, with reference to drawing 1005 of FIG. 10, the apparatus may select the second set of predetermined positions (e.g., second family/family B: {2(3),5,8,11}) and position the DM-RS symbols to be transmitted based on the predetermined positions (e.g., at symbols 2,5,8,11) corresponding to the selected second set of predetermined positions. In some configurations, the determined locations for the number of DM-RS symbols may comprise a subset of a selected one of the first set of predetermined DM-RS positions and the second set of predetermined DM-RS positions. For example, depending on the number of DM-RS symbols to be transmitted, DM-RS symbols may be positioned in a subset of the set of predetermined DM-RS positions.

At 1708, the apparatus may signal (e.g., transmit an indication to) another device, information indicating the selected one of the first set of predetermined positions or the second set of predetermined positions. For example, the apparatus may be a base station that may determine the locations for DM-RS symbols transmitted in a downlink channel to a UE based on the selection between the first or the second set of predetermined positions. In such an example, at 1708 the base station may indicate to the UE as to which of the first or the second set of predetermined positions for DM-RS symbols is used for positioning the DM-RS symbols in the downlink transmission. In some configurations, the number of DM-RS symbols in the scheduling unit may also be indicated to the UE. The UE may use the received indication for properly processing a received downlink transmission in which the DM-RS configurations is based on the first or second set of predetermined DM-RS positions. In some configurations, the UE may also use the indicated one of the first or the second set of predetermined DM-RS positions for positioning DM-RS symbols in its uplink scheduling unit. In another example, the apparatus may be a UE that may determine the locations for DM-RS symbols to be transmitted in an uplink or sidelink channel (e.g., based on indication from a base station regarding the selection of the first or the second set of predetermined positions). For an example case where the UE may transmit DM-RS within a sidelink channel to another device (e.g., a second UE), at 1708 the UE may indicate to the second UE as to which of the first or the second set of predetermined positions for DM-RS symbols is used for positioning the DM-RS symbols in the downlink transmission.

At 1710, the apparatus may transmit the number of DM-RS symbols in the scheduling unit based on the determined locations (e.g., that are determined in accordance with the symbol locations/positions associated with the selected one of the first or second family of DM-RS symbol location). For example, the apparatus may transmit a scheduling unit including DM-RS symbols positioned at the determined locations within the scheduling unit. Various additional features and aspects related to the method of flowchart 1700 are discussed in connection with FIGS. 8-13.

Figure 18:
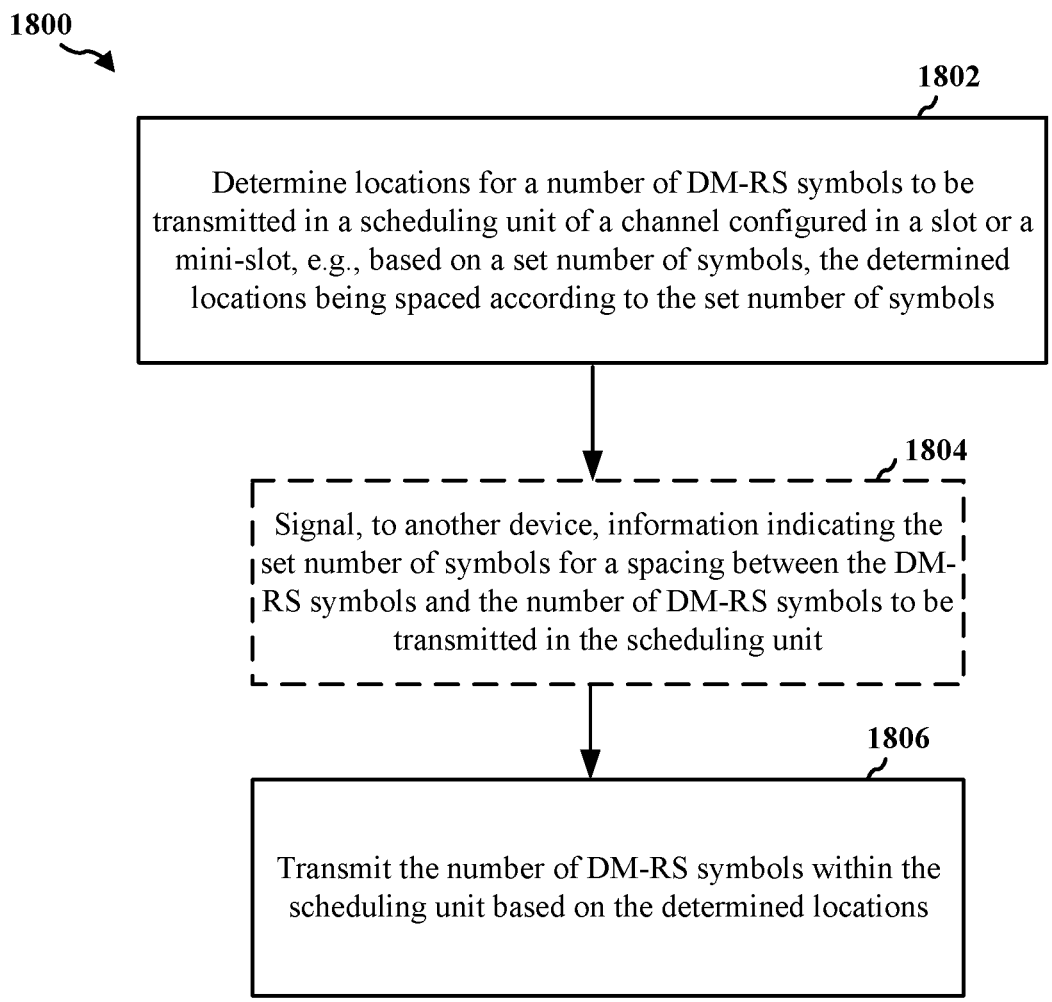
FIG. 18 is a flowchart of yet another method of wireless communication.

FIG. 18 is a flowchart 1800 of yet another example method of wireless communication. The method may be performed by an apparatus, e.g., such as apparatus 1902/1902' which may be a UE or a base station.

At 1802, the apparatus may determine locations for a number of DM-RS symbols to be transmitted within a scheduling unit of a channel configured in a slot or a mini-slot, e.g., based on a set number of symbols. For example, the set number of symbols may be a number (e.g., X) indicating a spacing between consecutive DM-Rs symbols in a slot or scheduling unit. In as aspect, the determined locations may be spaced according to the set number of symbols. In other words, the DM-RS symbols to be transmitted may be positioned within the scheduling unit of the channel in the slot or mini-slot in accordance with the set number of symbols. In such an approach, the DM-RS symbols may be transmitted every X symbols in accordance with a set value of X as discussed in connection with FIGS. 14-15. For example, as discussed supra, in an aspect the DM-RS symbols may be positioned every X symbols (e.g., the set number of symbols) in the scheduling unit, where X may be chosen from, e.g., {3,4,5}. That is, the distance/spacing between consecutive DM-RS symbols in a scheduling unit may be based on a value of X chosen for a given configuration. For example, with X={3,4,5}, the distance/spacing between consecutive DM-RS symbols in the scheduling unit may be 2 symbols, 3 symbols, 4 symbols or another number of symbols determined based on the value of X as illustrated in FIG. 14.

In some configurations, the number of DM-RS symbols within the scheduling unit may be uniformly spaced based on the set number of symbols. In some configurations, a spacing between consecutive DM-RS symbols of the number of DM-RS symbols is based on the set number of symbols. For example, with reference to drawing 1405 of FIG. 14, a case with the set number of symbols X=3 is illustrated where DM-RS symbols are transmitted every 3 symbols in the slot. As shown in the example of drawing 1405, the DM-RS symbols are transmitted in the symbols with index 3, 6, 9 and 12, e.g., showing a DM-RS transmission every 3 symbols. The distance/spacing between consecutive DM-RS symbols in the slot/scheduling unit in this case is 2 (i.e., X−1). Thus, as can be appreciated, the DM-RS symbols are spaced apart according to the set number of symbols (e.g., value of X), which in the above example is 3. In one configuration, the apparatus may be a base station (e.g., base station 180/310). The base station may select (e.g., from the set of possible values {3,4,5}) the value of X based on, for example slot type/configuration, size/duration of the scheduling unit within the slot/mini-slot, deployment environment, etc. In some configurations, X may be chosen randomly from the set of possible values {3,4,5}. In another configuration, the apparatus may be a UE (e.g., UE 104/350). In such a configuration, for an uplink or sidelink transmission, the UE may select X based on configuration from a base station. Thus, for a UE implementation, the determination (at 1902) of locations for a number of DM-RS symbols to be transmitted within a scheduling unit may be based on the set number of symbols that may be configured by the base station and indicated to the UE.

At 1804, the apparatus may signal (e.g., transmit an indication to) another device (e.g., a UE) information indicating the set number of symbols for a spacing between the DM-RS symbols and the number of DM-RS symbols being transmitted in the scheduling unit. For example, the apparatus may be a base station that may select the set number of symbols (X) for configuring DM-RS symbols within a downlink scheduling unit (e.g., of a downlink channel such as a PDSCH), and may send an indication to a UE that may receive the downlink transmission. Based on the received configuration from the base station, the UE may determine the number of DM-RS symbols in the downlink channel and spacing between the DM-RS for processing of the downlink transmission from the base station. In some configurations, the UE may also use the received information indicating the set number of symbols and the number of DM-RS symbols for configuring DM-Rs symbols in its uplink scheduling unit.

In another example, the apparatus may be a UE that may determine the locations for DM-RS symbols, e.g., to be transmitted in an uplink or sidelink channel. The UE may perform such determination, e.g., based on an indication/configuration regarding a selected value of X from a base station. For one example case where the UE may transmit DM-RS symbols within a sidelink channel to another device (e.g., a second UE), at 1804 the UE may indicate to the second UE the information indicating the set number of symbols (X) and the number of DM-RS symbols being transmitted in the scheduling unit.

At 1806, the apparatus may transmit the number of DM-RS symbols in the scheduling unit based on the determined locations. As discussed supra, the number and the locations of the DM-RS symbols in the scheduling un be on the set number of symbols (X). For example, the apparatus may transmit a scheduling unit (such as illustrated in the examples shown in FIGS. 14-15) including DM-RS symbols positioned at the locations within the scheduling unit determined based on X. Various additional features and aspects related to the method of flowchart 1800 are discussed with respect to FIGS. 14-15.

Figure 19:
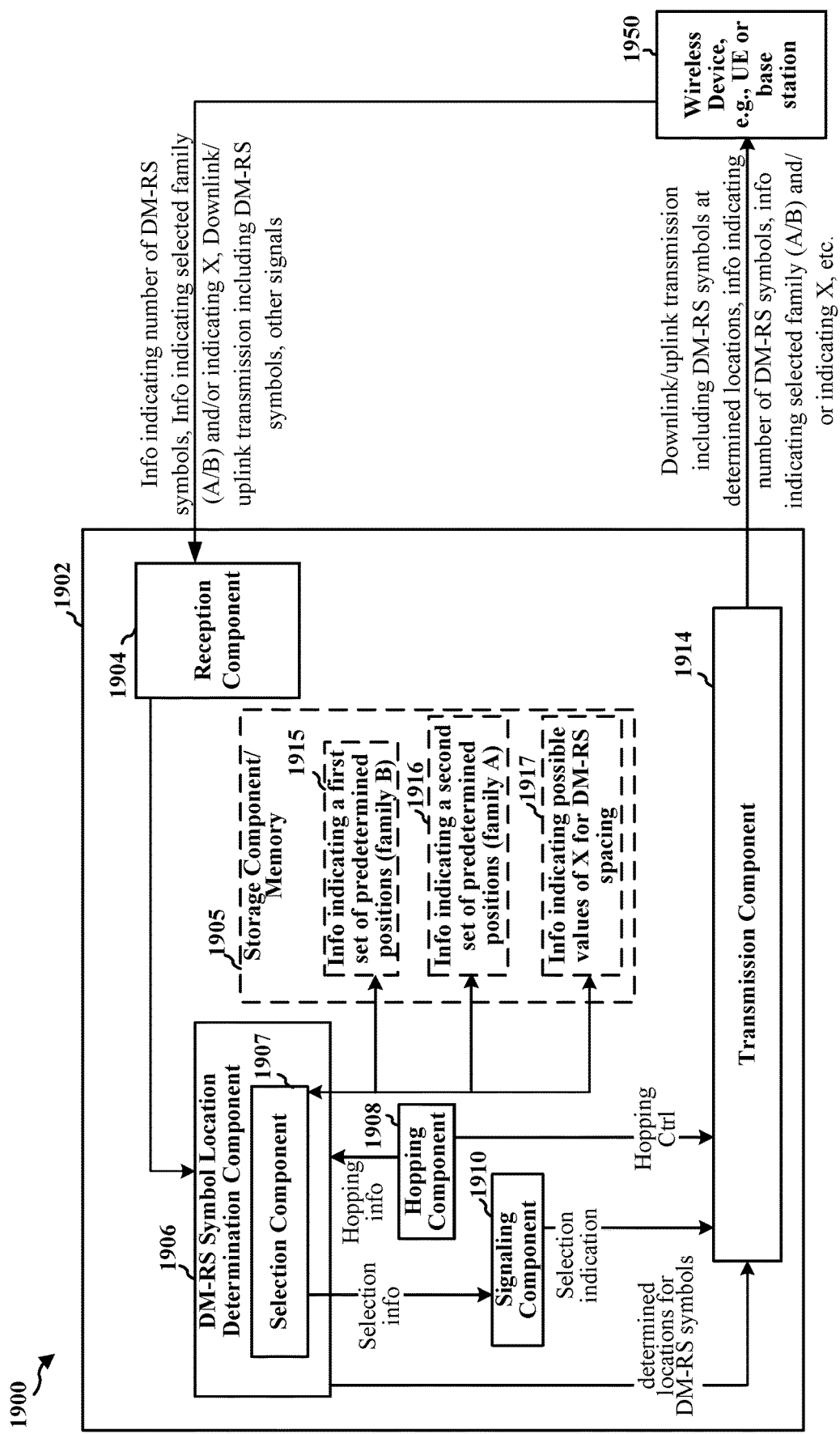
FIG. 19 is a conceptual data flow diagram illustrating the data flow between different means/components in an exemplary apparatus.

FIG. 19 is a conceptual data flow diagram 1900 illustrating the data flow between different means/components in an exemplary apparatus 1902. The apparatus may be base station or a UE, that may implement the method of flowchart 1600, and/or flowchart 1700, and/or flowchart 1800. In one configuration, the apparatus 1902 may include a reception component 1904, a storage component 1905 (including stored sets of information), a DM-RS symbol location determination component 1906 (including a selection component 1907), a hopping component 1908, a signaling component 1910, and a transmission component 1912. The apparatus 1902 may include additional components that may perform one or more additional operations/functions discussed supra in connection with FIGS. 4-15. The device 1950 (e.g., a base or a UE) may include the same or similar components as shown with respect to the apparatus 1902 and discussed below. In one configuration, the apparatus 1902 may be a base station and the device 1950 may be a UE. In one configuration, the apparatus 1902 may be a UE and the device 1950 may be a base station.

The reception component 1904 may be configured to receive various types of signals/messages and/or other information from other devices including wireless device 1950. The messages/information may be received via the reception component 1904 and provided to one or more components of the apparatus 1902 for further processing and use in performing various operations. For example, depending on the configuration of the apparatus 1902 (e.g., whether implemented as a base station or a UE), the apparatus may receive different types of signaling/information. For example, when the apparatus 1902 is a base station and the device 1950 is a UE, via the reception component 1904 the apparatus 1902 (or the components included therein) may receive an uplink transmission including DM-RS symbols that may be located at symbol locations determined in accordance with the methods discussed supra. In another configuration where the apparatus 1902 may be a UE and the device 1950 may be a base station, via the reception component 1904 the apparatus 1902 may receive a downlink transmission including DM-RS symbols that may be located at symbol locations determined in accordance with the methods discussed supra. Furthermore, in one such configuration, via the reception component 1904 the apparatus 1902 may receive a signal from the device 1950 (base station) including information indicating a maximum number of DM-RS symbols in a downlink scheduling unit and/or their locations, information indicating selected one of a first set of predetermined positions of DM-RS symbols (e.g., family B) or a second set of predetermined positions of DM-RS symbols (e.g., family A). For example, as discussed supra, a base station may select one of the families of DM-RS symbol locations and signal this information to the UE. In one configuration where the apparatus 1902 may be a UE and the device 1950 may be a base station, via the reception component 1904 the apparatus 1902 may receive, from the device 1950, information indicating a set number of symbols for a spacing between the DM-RS symbols and a number of DM-RS symbols being transmitted in a downlink scheduling unit.

The storage component 1905 may store various data sets that may be used, in some configurations, in determining the locations for a number of DM-RS symbols to be transmitted in a scheduling unit. The storage component 1905 may include data set 1915 including information indicating a first set of predetermined positions (e.g., family B) for DM-RS symbols to be transmitted in a scheduling unit, and a data set 1916 including information indicating a second set of predetermined positions (e.g., family A) for DM-RS symbols to be transmitted in a scheduling unit. The storage component 1905 may further include a data set 1917 including information indicating possible values of X which is a set number of symbols based on which DM-RS spacing within a scheduling unit may be determined in some configurations.

The DM-RS symbol location determination component 1906 may be configured to determine locations for a number of DM-RS symbols to be transmitted within a scheduling unit of a channel included in a slot or mini-slot, in accordance with the methods of flowchart 1600 and/or flowchart 1700 and/or flowchart 1800. In a first configuration, the DM-RS symbol location determination component 1906 may be configured to determine that a last DM-RS symbol be positioned one symbol prior to a last symbol carrying scheduled data in the scheduling unit. As part of being configured to determine the locations for the DM-RS symbols, the DM-RS symbol location determination component 1906 may be further configured to determine that a first DM-RS symbol be positioned at a front load position within the scheduling unit. In the first configuration, the DM-RS symbol location determination component 1906 may be further configured to determine that a third DM-RS symbol be positioned between the first DM-RS symbol and the last DM-RS symbol within the scheduling unit. In the first configuration, the DM-RS symbol location determination component 1906 may be further configured to determine that a third DM-RS symbol be positioned within the scheduling unit at an equal distance from the first DM-RS symbol and the last DM-RS symbol. In the first configuration, the DM-RS symbol location determination component 1906 may be further configured to determine that a third DM-RS symbol be positioned between the first DM-RS symbol and the last DM-RS symbol within the scheduling unit such that a spacing between the first DM-RS symbol and the third DM-RS symbol and a spacing between the third DM-RS symbol and the last DM-RS symbol differ by one symbol. In the first configuration, the DM-RS symbol location determination component 1906 may be further configured to determine that a third DM-RS symbol and a fourth DM-RS symbol be positioned midway between the first DM-RS symbol and the last DM-RS symbol within the scheduling unit such that a spacing between any two consecutive DM-RS symbols within the scheduling unit is the same or different by a maximum of one symbol.

In the first configuration, the DM-RS symbol location determination component 1906 may be configured to determine the DM-RS symbol locations based on one or more of a duration of the scheduling unit, a number of control symbols in the slot or mini-slot, a number of guard symbols in the slot or mini-slot, a number of symbols carrying scheduled data, and a deployment environment as discussed supra.

The hopping component 1908 may be configured to control intra-slot/intra-scheduling unit frequency hopping. For example, the hopping component 1908 may implement frequency hopping within the scheduling unit and control the transmission component 1912 to transmit portions of the scheduling unit (when frequency hopping is employed) in different frequency bands (e.g., as illustrated in FIG. 7). The hopping component 1908 may be configured to provide information to the determination component 1906 indicating whether or not frequency hopping is being employed within a scheduling unit to be transmitted. In the first configuration, the DM-RS symbol location determination component 1906 may be further configured to determine the DM-RS symbol locations based on whether frequency hopping is employed within the scheduling unit. In one configuration, when frequency hopping is employed within the scheduling unit, the DM-RS symbol location determination component 1906 may be further configured to determine a same pattern of DM-RS positions for each frequency hop within the scheduling unit as discussed supra in connection with FIG. 7 and flowchart 1600.

In a second configuration, the DM-RS symbol location determination component 1906 may be configured to determine locations for a number of DM-RS symbols to be transmitted within a scheduling unit of a channel included in a slot or mini-slot based on a selection between a first set of predetermined positions of DM-RS symbols (e.g., family B of DM-RS symbol locations) and a second set of predetermined DM-RS positions (e.g., family A of DM-RS symbol locations). In the second configuration, the selection component 1907 of the determination component may be configured to select between the first set of predetermined positions and the second set of predetermined DM-RS positions. For example, in some configurations, the selection between the first set of predetermined positions and the second set of predetermined DM-RS positions may be based on one or more of a deployment environment, a size/duration of an uplink burst within the slot or mini-slot, a number of control symbols burst within the slot or mini-slot, and number of symbols carrying scheduled data as discussed supra. In one configuration, the determined locations for the number of DM-RS symbols may comprise a subset of a selected one of the first set of predetermined DM-RS positions and the second set of predetermined DM-RS positions.

The signaling component 1910 may be configured to generate a signal including information regarding the number and/or locations of DM-RS symbols within a scheduling unit, and/or information related to DM-RS configuration in a scheduling unit and transmit (e.g., via the transmission component 1912) to the device 1950. For example, in one configuration, where the apparatus 1902 may be a base station and the device 1950 may be a UE, the signaling component 1910 may be configured to generate and signal (e.g., transmit via the transmission component 1912) the device 1950, information indicating the selected one of the first set of predetermined positions or the second set of predetermined positions. In one configuration, where the apparatus 1902 may be a UE and the device 1950 may be a second UE, the signaling component 1910 may be configured to generate and signal (e.g., transmit via the transmission component 1912) the device 1950, information indicating the selected one of the first set of predetermined positions or the second set of predetermined positions.

In a third configuration, the DM-RS symbol location determination component 1906 may be configured to determine locations for a number of DM-RS symbols to be transmitted within a scheduling unit of a channel included in a slot or mini-slot based on based on a set (e.g., predetermined) number of symbols (e.g., X), wherein the determined locations are spaced apart according to the set number of symbols (X). For example, in the third configuration, the DM-RS symbol location determination component 1906 may be configured to determine the DM-RS symbol locations based on a selected value of X, where X may be one of {3, 4, 5}. In the third configuration, the selection component 1907 (of the DM-RS symbol location determination component 1906) may select the value of X in the manner discussed above in connection with FIGS. 14-15. In the third configuration, the DM-RS symbol location determination component 1906 may be configured to determine that the number of DM-RS symbols within the scheduling unit may be uniformly spaced based on the set number of symbols. In the third configuration, the DM-RS symbol location determination component 1906 may be further configured to determine a spacing between consecutive DM-RS symbols of the number of DM-RS symbols based on the set number of symbols.

The transmission component 1912 may be configured to transmit uplink/downlink data and/or other information to one or more external devices including, e.g., the device 1950. In various configurations, the signals and/or information may be transmitted by the transmission component 1912 in accordance with the methods discussed supra including the methods of flowcharts of FIGS. 16-18. For example, the transmission component may be configured to transmitting the number of DM-RS symbols in the scheduling unit based on the determined locations for the number of DM-RS symbols. For example, in the first configuration, the transmission component 1912 may transmit the first DM-RS symbol at the front-load position in the scheduling unit and the last DM-RS symbol one symbol prior to a last symbol carrying scheduled data in the scheduling unit. In the first configuration, the transmission component 1912 may be further configured to transmit the third DM-RS symbol at a symbol location between the first DM-RS symbol and the last DM-RS symbol within the scheduling unit. In one configuration, the transmission component 1912 may be configured to transmit the third DM-RS symbol within the scheduling unit such that the third symbol is at an equal distance from the first DM-RS symbol and the last DM-RS symbol. In the first configuration, in general, the transmission component 1912 may transmit the number of DM-RS symbols in a scheduling unit based on the DM-RS positions/locations determined by the DM-RS symbol location determination component 1906.

In the second configuration, the transmission component 1912 may be configured to transmit the number of DM-RS symbols in the scheduling unit at DM-RS symbol locations/positions associated with the selected one of the first or second set of predetermined positions for DM-RS symbols (selected by the selection component 1907 of the determination component 1906) as discussed in detail supra in connection with FIGS. 8-13 and the flowchart 1700.

In the third configuration, the transmission component 1912 may be configured to transmit the number of DM-RS symbols in the scheduling unit at DM-RS symbol locations/positions based on the selected value of X (selected by the selection component 1907 of the determination component 1906) as discussed in detail supra in connection with FIGS. 14-15 and the flowchart 1800.

The apparatus may include additional components that perform each of the blocks of the algorithm in the aforementioned flowcharts of FIGS. 16-18. As such, each block in the aforementioned flowcharts of FIGS. 16-18 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 20:
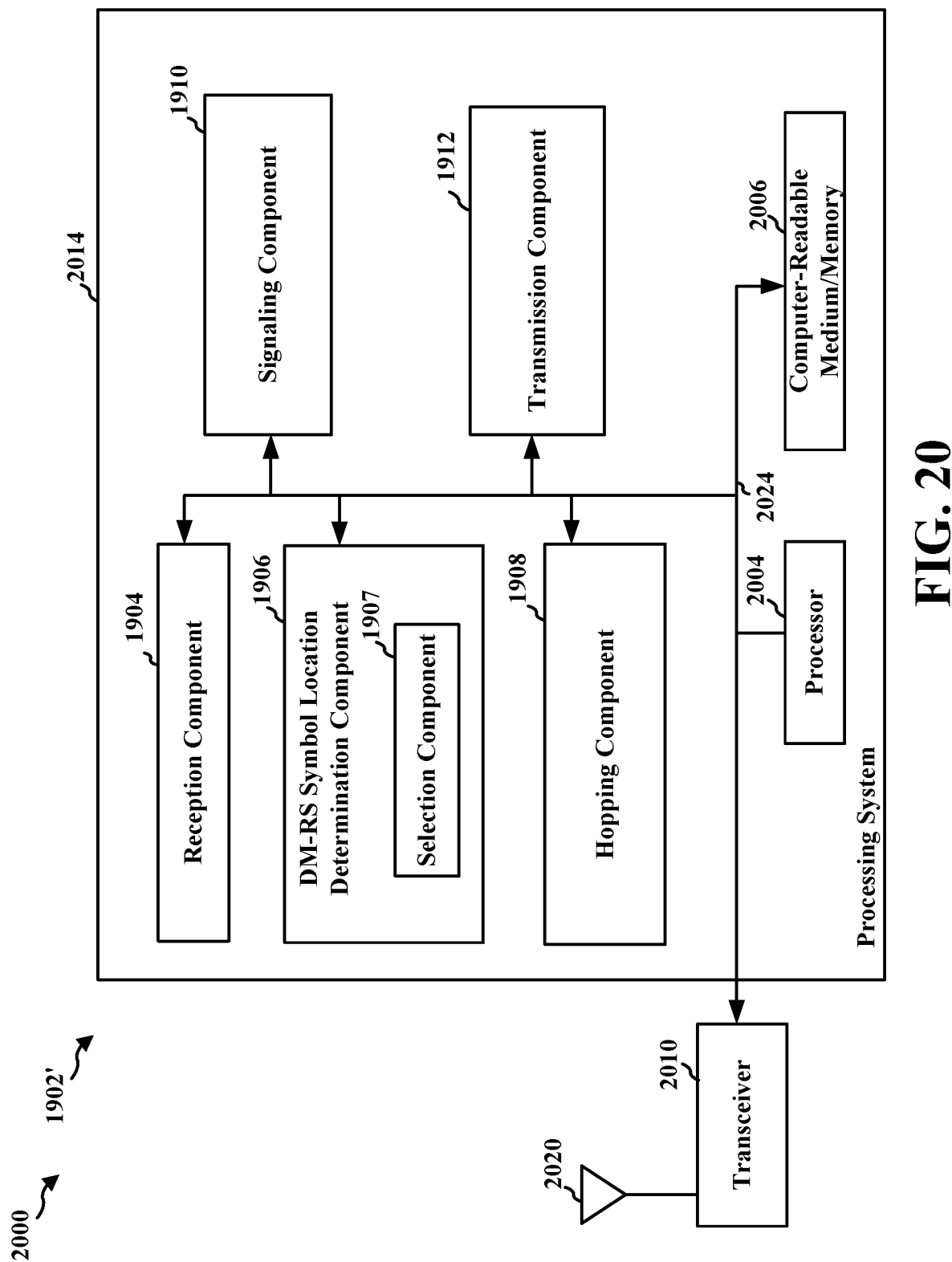
FIG. 20 is a diagram illustrating an example of a hardware implementation for an apparatus employing a processing system.

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware components, represented by the processor 2004, the components 1904, 1906, 1908, 1910, 1912, and the computer-readable medium/memory 2006 that may include the storage component 1905. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the reception component 1904. In addition, the transceiver 2010 receives information from the processing system 2014, specifically the transmission component 1912, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system 2014 further includes at least one of the components 1904, 1906, 1908, 1910, 1912. The components may be software components running in the processor 2004, resident/stored in the computer readable medium/memory 2006, one or more hardware components coupled to the processor 2004, or some combination thereof. In one configuration, the processing system 2014 may be a component of the UE 350 and may include the memory 360 and/or at least one of the TX processor 368, the RX processor 356, and the controller/processor 359. In another configuration, the processing system 2014 may be a component of the base station 310 and may include the memory 376 and/or at least one of the TX processor 316, the RX processor 370, and the controller/processor 375.

In a first configuration, the apparatus 1902/1902' may comprise means for determining locations for a number of DM-RS symbols to be transmitted within a scheduling unit of a channel included in a slot or mini-slot, wherein a last DM-RS symbol is determined to be positioned one symbol prior to a last symbol carrying scheduled data. The apparatus 1902/1902' may further comprise means for transmitting the number of DM-RS symbols in the scheduling unit based on the determined locations.

In the first configuration, the means for determining the locations may be configured to determine that a first DM-RS symbol be positioned at a front load position within the scheduling unit, and the means for transmitting may be configured to transmit the first DM-RS symbol at the front-load position within the scheduling unit. In the first configuration, the means for determining the locations may be further configured to determine that a third DM-RS symbol be positioned between the first DM-RS symbol and the last DM-RS symbol within the scheduling unit, and the means for transmitting may be further configured to transmit the third DM-RS symbol at a symbol location between the first DM-RS symbol and the last DM-RS symbol within the scheduling unit.

In the first configuration, the means for determining the locations may be further configured to determine that a third DM-RS symbol be positioned within the scheduling unit at an equal distance from the first DM-RS symbol and the last DM-RS symbol.

In the first configuration, the means for determining the locations may be further configured to determine that a third DM-RS symbol be positioned between the first DM-RS symbol and the last DM-RS symbol within the scheduling unit such that a spacing between the first DM-RS symbol and the third DM-RS symbol and a spacing between the third DM-RS symbol and the last DM-RS symbol differ by one symbol.

In the first configuration, the means for determining the locations may be further configured to determine that a third DM-RS symbol and a fourth DM-RS symbol be positioned midway between the first DM-RS symbol and the last DM-RS symbol within the scheduling unit, and wherein a spacing between any two consecutive DM-RS symbols within the scheduling unit is the same or different by a maximum of one symbol.

In the first configuration, the means for determining may be configured to determine the locations based on one or more of a duration of the scheduling unit, a number of control symbols in the slot or mini-slot, a number of guard symbols in the slot or mini-slot, a number of symbols carrying scheduled data, and a deployment environment.

In the first configuration, when frequency hopping is employed within the scheduling unit a same pattern of DM-RS positions is determined for each frequency hop within the scheduling unit.

In accordance with one aspect, the apparatus 1902/1902' may comprise a memory (e.g., memory 1905/2006) and at least one processor (e.g., processor 2004 coupled to the memory. In the first configuration, the at least one processor may be configured to determine locations for a number of Demodulation Reference Signal (DM-RS) symbols to be transmitted within a scheduling unit of a channel included in a slot or mini-slot, wherein a last DM-RS symbol is determined to be positioned one symbol prior to a last symbol carrying scheduled data. The at least one processor may be further configured to transmit the number of DM-RS symbols in the scheduling unit based on the determined locations.

In a second configuration, the apparatus 1902/1902' may comprise means for determining locations for a number of DM-RS symbols to be transmitted within a scheduling unit of a channel included in a slot or mini-slot based on a selection between a first set of predetermined positions and a second set of predetermined DM-RS positions. The apparatus 1902/1902' may further comprise means for transmitting the number of DM-RS symbols in the scheduling unit based on the determined locations.

In the second configuration, the determined locations for the number of DM-RS symbols comprises a subset of a selected one of the first set of predetermined DM-RS positions and the second set of predetermined DM-RS positions.

In the second configuration, the means for determining the locations may be further configured to select between the first set of predetermined positions and the second set of predetermined DM-RS positions based on one or more of a deployment environment, a size/duration of an uplink burst within the slot or mini-slot, a number of control symbols burst within the slot or mini-slot, and number of symbols carrying scheduled data.

In the second configuration, the apparatus 1902/1902' may be a base station, and may further comprise means for signaling, a user equipment (e.g., device 1950), information indicating the selected one of the first set of predetermined positions or the second set of predetermined positions.

In one variation of the second configuration, the apparatus 1902/1902' may be a first UE, and may further comprise means for signaling, a second UE (e.g., device 1950), information indicating the selected one of the first set of predetermined positions or the second set of predetermined positions.

In accordance with one aspect, in the second configuration, the at least one processor may be configured to determine locations for a number of DM-RS symbols to be transmitted within a scheduling unit of a channel included in a slot or mini-slot based on a selection between a first set of predetermined DM-RS positions and a second set of predetermined DM-RS positions. The at least one processor may be further configured to transmit the number of DM-RS symbols in the scheduling unit based on the determined locations.

In a third configuration, the apparatus 1902/1902' may comprise means for determining locations for a number of DM-RS symbols to be transmitted within a scheduling unit of a channel in a slot or mini-slot based on a set number of symbols, wherein the determined locations are spaced apart according to the set number of symbols. The apparatus 1902/1902' may further comprise means for transmitting the number of DM-RS symbols within the scheduling unit based on the determined locations.

In the third configuration, the number of DM-RS symbols may be uniformly spaced within the scheduling unit based on the set number of symbols. In the third configuration, a spacing between consecutive DM-RS symbols of the number of DM-RS symbols may be based on the set number of symbols.

In the third configuration, the apparatus 1902/1902' may be a base station, and may further comprise means for signaling, to a user equipment, information indicating the set number of symbols for a spacing between the DM-RS symbols and the number of DM-RS symbols being transmitted in the scheduling unit.

In one variation of the third configuration, the apparatus 1902/1902' may be a first UE, and may further comprise means for signaling, to a second UE, information indicating the set number of symbols for a spacing between the DM-RS symbols and the number of DM-RS symbols being transmitted in the scheduling unit.

In accordance with one aspect, in the third configuration, the at least one processor may be configured to determine locations for a number of Demodulation Reference Signal (DM-RS) symbols to be transmitted within a scheduling unit of a channel in a slot or mini-slot based on a set number of symbols, wherein the determined locations are spaced apart according to the set number of symbols. The at least one processor may be further configured to transmit the number of DM-RS symbols within the scheduling unit based on the determined locations.

The aforementioned means may be one or more of the aforementioned components of the apparatus 1902 and/or the processing system 2014 of the apparatus 1902' configured to perform the functions recited by the aforementioned means. As described supra, in one configuration the processing system 2014 may include the TX Processor 368, the RX Processor 356, and the controller/processor 359. As such, in such a configuration, the aforementioned means may be the TX Processor 368, the RX Processor 356, and the controller/processor 359 configured to perform the functions recited by the aforementioned means. In another configuration, the processing system 2014 may include the TX Processor 316, the RX Processor 370, and the controller/processor 375. As such, in such a configuration, the aforementioned means may be the TX Processor 316, the RX Processor 370, and the controller/processor 375 configured to perform the functions recited by the aforementioned means.

In one configuration, the apparatus 902/902' may comprise a computer readable medium storing computer executable code, comprising code to: determine locations for a number of Demodulation Reference Signal (DM-RS) symbols to be transmitted within a scheduling unit of a channel included in a slot or mini-slot, wherein a last DM-RS symbol is determined to be positioned one symbol prior to a last symbol carrying scheduled data, and transmit the number of DM-RS symbols in the scheduling unit based on the determined locations.

In one configuration, the apparatus 902/902' may comprise a computer readable medium storing computer executable code, comprising code to: determine locations for a number of Demodulation Reference Signal (DM-RS) symbols to be transmitted within a scheduling unit of a channel included in a slot or mini-slot based on a selection between a first set of predetermined DM-RS positions and a second set of predetermined DM-RS positions, and transmit the number of DM-RS symbols in the scheduling unit based on the determined locations.

In one configuration, the apparatus 902/902' may comprise a computer readable medium storing computer executable code, comprising code to: determine locations for a number of Demodulation Reference Signal (DM-RS) symbols to be transmitted within a scheduling unit of a channel in a slot or mini-slot based on a set number of symbols, wherein the determined locations are spaced apart according to the set number of symbols, and transmit the number of DM-RS symbols within the scheduling unit based on the determined locations.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of an apparatus, comprising:
   determining locations for a plurality of Demodulation Reference Signal (DM-RS) symbols to be transmitted in frequency hops within a scheduling unit of a channel included in a slot or mini-slot, wherein the determined locations of the DM-RS symbols in each frequency hop are based on a duration of the scheduling unit and on one or more of a number of control symbols in the slot or mini-slot, or a number of symbols carrying scheduled data, and wherein a last DM-RS symbol of the plurality of DM-RS symbols is determined to be positioned one symbol prior to a last symbol carrying scheduled data; and
   transmitting the plurality of DM-RS symbols in the scheduling unit based on the determined locations.

2. The method of claim 1, wherein determining the locations comprises determining that a first DM-RS symbol be positioned at a front load position within the scheduling unit, and
   wherein transmitting the plurality of DM-RS symbols comprises transmitting the first DM-RS symbol at the front load position based on the determined locations.

3. The method of claim 2, wherein determining the locations further comprises determining that a third DM-RS symbol be positioned between the first DM-RS symbol and the last DM-RS symbol within the scheduling unit, and wherein transmitting the plurality of DM-RS symbols comprises transmitting the third DM-RS symbol at a symbol location between the first DM-RS symbol and the last DM-RS symbol within the scheduling unit.

4. The method of claim 2, wherein determining the locations further comprises determining that a third DM-RS symbol be positioned within the scheduling unit at an equal distance from the first DM-RS symbol and the last DM-RS symbol.

5. The method of claim 2, wherein determining the locations further comprises determining that a third DM-RS symbol be positioned between the first DM-RS symbol and the last DM-RS symbol within the scheduling unit such that a first spacing between the first DM-RS symbol and the third DM-RS symbol and a second spacing between the third DM-RS symbol and the last DM-RS symbol differ by one symbol.

6. The method of claim 2, wherein determining the locations further comprises determining that a third DM-RS symbol and a fourth DM-RS symbol be positioned midway between the first DM-RS symbol and the last DM-RS symbol within the scheduling unit, and wherein a spacing between any two consecutive DM-RS symbols within the scheduling unit is the same or different by a maximum of one symbol.

7. The method of claim 1, wherein the determined locations are further based on one or more of a number of guard symbols in the slot or mini-slot.

8. The method of claim 1, wherein a same pattern of DM-RS positions is determined for each frequency hop within the scheduling unit.

9. The method of claim 1, wherein the apparatus comprises a base station.

10. The method of claim 1, wherein the channel is a physical downlink shared channel (PDSCH).

11. The method of claim 1, wherein the duration of the scheduling unit is smaller than 14 symbols.

12. An apparatus for wireless communication, comprising:
a memory; and
at least one processor coupled to the memory and configured to:
determine locations for a plurality of Demodulation Reference Signal (DM-RS) symbols to be transmitted in frequency hops within a scheduling unit of a channel included in a slot or mini-slot, wherein the determined locations of the DM-RS symbols in each frequency hop are based on a duration of the scheduling unit and on one or more of a number of control symbols in the slot or mini-slot, or a number of symbols carrying scheduled data, and wherein a last DM-RS symbol of the plurality of DM-RS symbols is determined to be positioned one symbol prior to a last symbol carrying scheduled data; and
transmit the plurality of DM-RS symbols in the scheduling unit based on the determined locations.

13. The apparatus of claim 12, wherein the at least one processor is further configured, as part of being configured to determine the locations for the plurality of DM-RS symbols, to determine that a first DM-RS symbol be positioned at a front load position within the scheduling unit, and wherein the at least one processor is further configured, as part of being configured to transmit the plurality of DM-RS symbols, to transmit the first DM-RS symbol at the front load position within the scheduling unit based on the determined locations.

14. The apparatus of claim 13, wherein the at least one processor is further configured, as part of being configured to determine the locations for the plurality of DM-RS symbols, to determine that a third DM-RS symbol be positioned between the first DM-RS symbol and the last DM-RS symbol within the scheduling unit, and wherein the at least one processor is further configured, as part of being configured to transmit the plurality of DM-RS symbols, to transmit the third DM-RS symbol at a symbol location between the first DM-RS symbol and the last DM-RS symbol within the scheduling unit.

15. The apparatus of claim 13, wherein the at least one processor is further configured, as part of being configured to determine the locations for the plurality of DM-RS symbols, to determine that a third DM-RS symbol be positioned within the scheduling unit at an equal distance from the first DM-RS symbol and the last DM-RS symbol.

16. The apparatus of claim 12, wherein the at least one processor is configured to determine the locations further based on one or more of a number of guard symbols in the slot or mini-slot.

17. The apparatus of claim 12, wherein the at least one processor is configured to determine a pattern of DM-RS positions for each frequency hop within the scheduling unit, wherein the determined pattern is a same pattern for each frequency hop within the scheduling unit.

18. The apparatus of claim 12, wherein the apparatus comprises a base station.

19. An apparatus for wireless communication, comprising:
means for determining locations for a plurality of Demodulation Reference Signal (DM-RS) symbols to be transmitted in frequency hops within a scheduling unit of a channel included in a slot or mini-slot, wherein the determined locations of the DM-RS symbols in each frequency hop are based on a duration of the scheduling unit and on one or more of a number of control symbols in the slot or mini-slot, or a number of symbols carrying scheduled data, and wherein a last DM-RS symbol is determined to be positioned one symbol prior to a last symbol carrying scheduled data; and
means for transmitting the plurality of DM-RS symbols in the scheduling unit based on the determined locations.

20. The apparatus of claim 19, wherein the means for determining the locations is configured to determine that a first DM-RS symbol be positioned at a front load position within the scheduling unit, and wherein the means for transmitting the plurality of DM-RS symbols is configured to transmit the first DM-RS symbol at the front load position based on the determined locations.

21. The apparatus of claim 20, wherein the means for determining the locations is configured to determine that a third DM-RS symbol be positioned between the first DM-RS symbol and the last DM-RS symbol within the scheduling unit, and wherein the means for transmitting the plurality of DM-RS symbols is configured to transmit the third DM-RS symbol at a symbol location between the first DM-RS symbol and the last DM-RS symbol within the scheduling unit.

22. The apparatus of claim 19, wherein the determined locations are further based on one or more of a number of guard symbols in the slot or mini-slot.

23. A non-transitory computer-readable medium storing computer executable code, the code when executed by at least one processor of an apparatus, causes the at least one processor to:
  determine locations for a plurality of Demodulation Reference Signal (DM-RS) symbols to be transmitted in frequency hops within a scheduling unit of a channel included in a slot or mini-slot, wherein the determined locations of the DM-RS symbols in each frequency hop are based on a duration of the scheduling unit and on one or more of a number of control symbols in the slot or mini-slot, or a number of symbols carrying scheduled data, and wherein a last DM-RS symbol is determined to be positioned one symbol prior to a last symbol carrying scheduled data; and
  transmit the plurality of DM-RS symbols in the scheduling unit based on the determined locations.

24. The non-transitory computer-readable medium of claim 23, wherein the at least one processor is further caused, as part of being caused to determine the locations for the plurality of DM-RS symbols, to determine that a first DM-RS symbol be positioned at a front load position within the scheduling unit, and
  wherein the at least one processor is further caused, as part of being caused to transmit the plurality of DM-RS symbols, to transmit the first DM-RS symbol at the front load position within the scheduling unit.

25. The non-transitory computer-readable medium of claim 24, wherein the at least one processor is further caused, as part of being caused to determine the locations for the plurality of DM-RS symbols, to determine that a third DM-RS symbol be positioned between the first DM-RS symbol and the last DM-RS symbol within the scheduling unit, and
  wherein the at least one processor is further caused, as part of being caused to transmit the plurality of DM-RS symbols, to transmit the third DM-RS symbol at a symbol location between the first DM-RS symbol and the last DM-RS symbol within the scheduling unit.

26. The non-transitory computer-readable medium of claim 23, wherein the at least one processor is caused to determine the locations further based on one or more of a number of guard symbols in the slot or mini-slot.

27. The method of claim 1, wherein the apparatus comprises a user equipment.

28. The method of claim 1, wherein the channel is a physical uplink shared channel (PUSCH).

29. The apparatus of claim 13, wherein the at least one processor is further configured, as part of being configured to determine the locations for the plurality of DM-RS symbols, to determine that a third DM-RS symbol be positioned between the first DM-RS symbol and the last DM-RS symbol within the scheduling unit such that a first spacing between the first DM-RS symbol and the third DM-RS symbol and a second spacing between the third DM-RS symbol and the last DM-RS symbol differ by one symbol.

30. The apparatus of claim 13, wherein the at least one processor is further configured, as part of being configured to determine the locations for the plurality of DM-RS symbols, to determine that a third DM-RS symbol and a fourth DM-RS symbol be positioned midway between the first DM-RS symbol and a fourth DM-RS symbol be positioned midway between the first DM-RS symbol and the last DM-RS symbol within the scheduling unit, and wherein a spacing between any two consecutive DM-RS symbols within the scheduling unit is the same or different by a maximum of one symbol.

31. The apparatus of claim 12, wherein the channel is a physical downlink shared channel (PDSCH).

32. The apparatus of claim 12, wherein the channel is a physical uplink shared channel (PUSCH).

33. The apparatus of claim 12, wherein the duration of the scheduling unit is smaller than 14 symbols.

34. The apparatus of claim 12, wherein the apparatus comprises a user equipment.

* * * * *